United States Patent
Haver et al.

(10) Patent No.: US 9,824,387 B2
(45) Date of Patent: Nov. 21, 2017

(54) SYSTEMS AND METHODS INVOLVING PROXIMITY, MAPPING, INDEXING, MOBILE, ADVERTISING AND/OR OTHER FEATURES

(71) Applicants: Joe Haver, Colorado Springs, CO (US); Tammy Haver, Colorado Springs, CO (US)

(72) Inventors: Joe Haver, Colorado Springs, CO (US); Tammy Haver, Colorado Springs, CO (US)

(73) Assignee: Proximity Concepts, LLC, Colorado Springs, CO (US)

( * ) Notice: Subject to any disclaimer, the term of this patent is extended or adjusted under 35 U.S.C. 154(b) by 389 days.

(21) Appl. No.: 14/217,182

(22) Filed: Mar. 17, 2014

(65) Prior Publication Data

US 2014/0324627 A1    Oct. 30, 2014

Related U.S. Application Data

(60) Provisional application No. 61/801,062, filed on Mar. 15, 2013.

(51) Int. Cl.
| | |
|---|---|
| *G06Q 30/00* | (2012.01) |
| *G06Q 40/00* | (2012.01) |
| *G06Q 30/06* | (2012.01) |
| *G06Q 30/02* | (2012.01) |

(52) U.S. Cl.
CPC ..... *G06Q 30/0639* (2013.01); *G06Q 30/0207* (2013.01); *G06Q 30/0241* (2013.01); *G06Q 30/0273* (2013.01); *Y02E 50/30* (2013.01)

(58) Field of Classification Search
CPC .......... G06Q 30/02; G06Q 30/06; H04M 1/02
USPC ............ 455/556.1; 705/14.45, 26.3, 26.9, 28
See application file for complete search history.

(56) References Cited

U.S. PATENT DOCUMENTS

| | | | | |
|---|---|---|---|---|
| 6,542,114 B1* | 4/2003 | Eagleson | ........... | G06K 17/0022 340/993 |
| 8,952,895 B2* | 2/2015 | Moore | ...................... | G06F 3/01 345/158 |
| 8,989,053 B1* | 3/2015 | Skaaksrud | ........... | H04W 12/06 370/255 |
| 9,215,553 B2* | 12/2015 | Rowles | ................... | H04W 4/02 |
| 2004/0030832 A1* | 2/2004 | Squibbs | .............. | G06F 12/0886 711/118 |

(Continued)

OTHER PUBLICATIONS

"Invitation to Pay Additional Fees and, Where Applicable, Protest Fee," issued in counterpart application No. PCT/US2014/030811, dated Aug. 14, 2014 (2 pages).

(Continued)

*Primary Examiner* — Seye Iwarere
(74) *Attorney, Agent, or Firm* — DLA Piper LLP

(57) ABSTRACT

Systems and methods involving proximity, mapping, indexing, mobile, advertising, and location processing, among others, are disclosed. According to one illustrative implementation, a method of determining a mobile device location may comprise capturing product information from a product within a facility by a mobile device, retrieving a product location within the facility from a database based on the captured product information, and determining the mobile device location within the facility based on the product location and the product information.

9 Claims, 22 Drawing Sheets

(56) References Cited

U.S. PATENT DOCUMENTS

| | | | |
|---|---|---|---|
| 2007/0152057 A1 | 7/2007 | Cato et al. | |
| 2007/0290836 A1* | 12/2007 | Ainsworth | G06Q 10/08 340/539.13 |
| 2008/0004994 A1* | 1/2008 | Ainsworth | G01D 9/005 705/28 |
| 2008/0249898 A1* | 10/2008 | Ratnakar | G01S 5/0018 705/27.1 |
| 2009/0005021 A1* | 1/2009 | Forstall | H04M 1/72572 455/414.3 |
| 2009/0318168 A1* | 12/2009 | Khosravy | G06Q 30/0241 455/456.3 |
| 2011/0191207 A1* | 8/2011 | Schueller | G06Q 30/0639 705/26.9 |
| 2011/0195723 A1* | 8/2011 | Kim | H04M 1/72544 455/456.1 |
| 2012/0005016 A1* | 1/2012 | Graff | G06Q 30/0242 705/14.49 |
| 2012/0019674 A1* | 1/2012 | Ohnishi | G08C 17/00 348/207.1 |
| 2012/0022930 A1 | 1/2012 | Brouhard | |
| 2012/0095805 A1* | 4/2012 | Ghosh | G06Q 30/0205 705/7.34 |
| 2012/0108259 A1* | 5/2012 | Weiss | G06Q 30/0261 455/456.1 |
| 2012/0214515 A1* | 8/2012 | Davis | H04W 4/023 455/456.3 |
| 2013/0036043 A1 | 2/2013 | Faith | |
| 2013/0048721 A1* | 2/2013 | Rasband | G06F 17/30879 235/383 |
| 2013/0124362 A1* | 5/2013 | Katcher | G06Q 30/0633 705/26.8 |
| 2013/0191246 A1* | 7/2013 | Calman | G06Q 30/0639 705/26.9 |
| 2013/0218463 A1* | 8/2013 | Howard | G06F 17/30657 701/533 |
| 2013/0253832 A1* | 9/2013 | Nallu | G06Q 30/0633 701/537 |
| 2013/0265223 A1* | 10/2013 | Khosravy | G01C 21/20 345/156 |
| 2013/0288718 A1* | 10/2013 | MacGougan | H04W 52/0274 455/456.4 |
| 2013/0346189 A1* | 12/2013 | Isaacs | G06Q 30/0255 705/14.45 |
| 2014/0045549 A1* | 2/2014 | Ryan | H04N 5/3532 455/556.1 |
| 2014/0108179 A1* | 4/2014 | Zhu | G06Q 30/08 705/26.3 |
| 2014/0282015 A1* | 9/2014 | Nixon | G05B 11/01 715/733 |
| 2014/0324627 A1* | 10/2014 | Haver | G06Q 30/0639 705/26.9 |
| 2014/0365334 A1* | 12/2014 | Hurewitz | G06Q 30/0613 705/26.41 |
| 2015/0012396 A1* | 1/2015 | Puerini | G06Q 10/0875 705/28 |
| 2015/0170258 A1* | 6/2015 | Kulig | G06Q 30/0639 705/26.9 |
| 2015/0289095 A1* | 10/2015 | Sabatelli | H04W 4/021 455/414.2 |
| 2016/0006577 A1* | 1/2016 | Logan | H04L 12/2827 700/276 |

OTHER PUBLICATIONS

International Search Report and Written Opinion in related application No. PCT/US2014/030811 dated Oct. 14, 2014, 11 pgs.

Extended European Search Report for EP 14763267.3 dated Oct. 14, 2016; (8 pgs.).

* cited by examiner

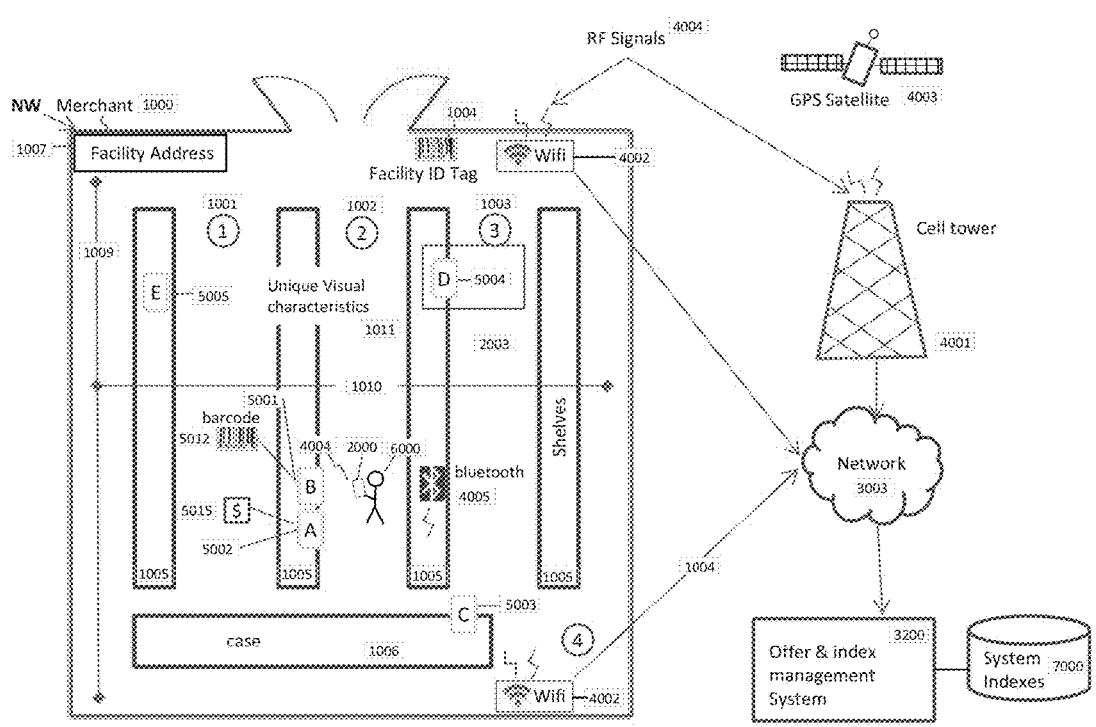

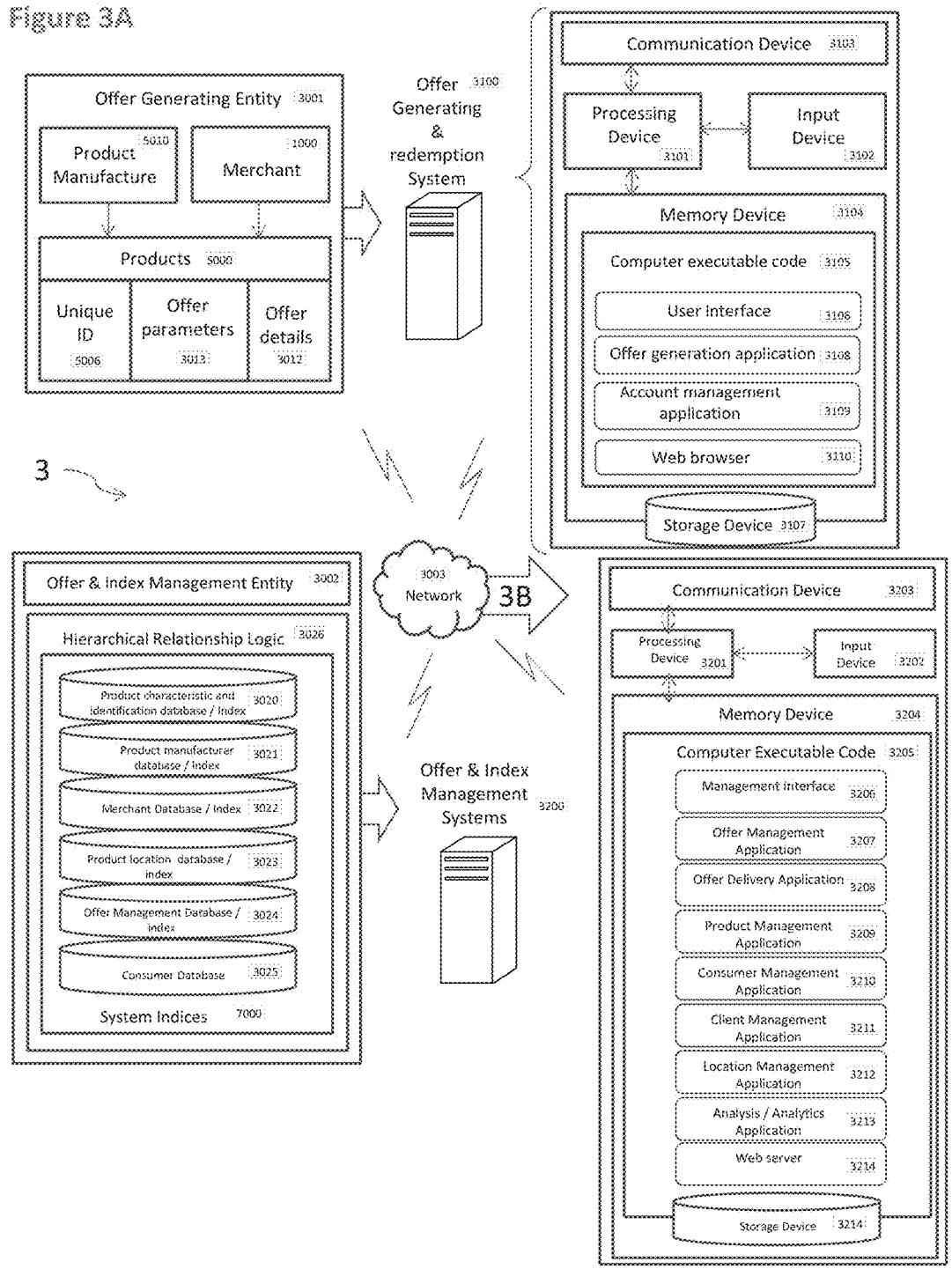

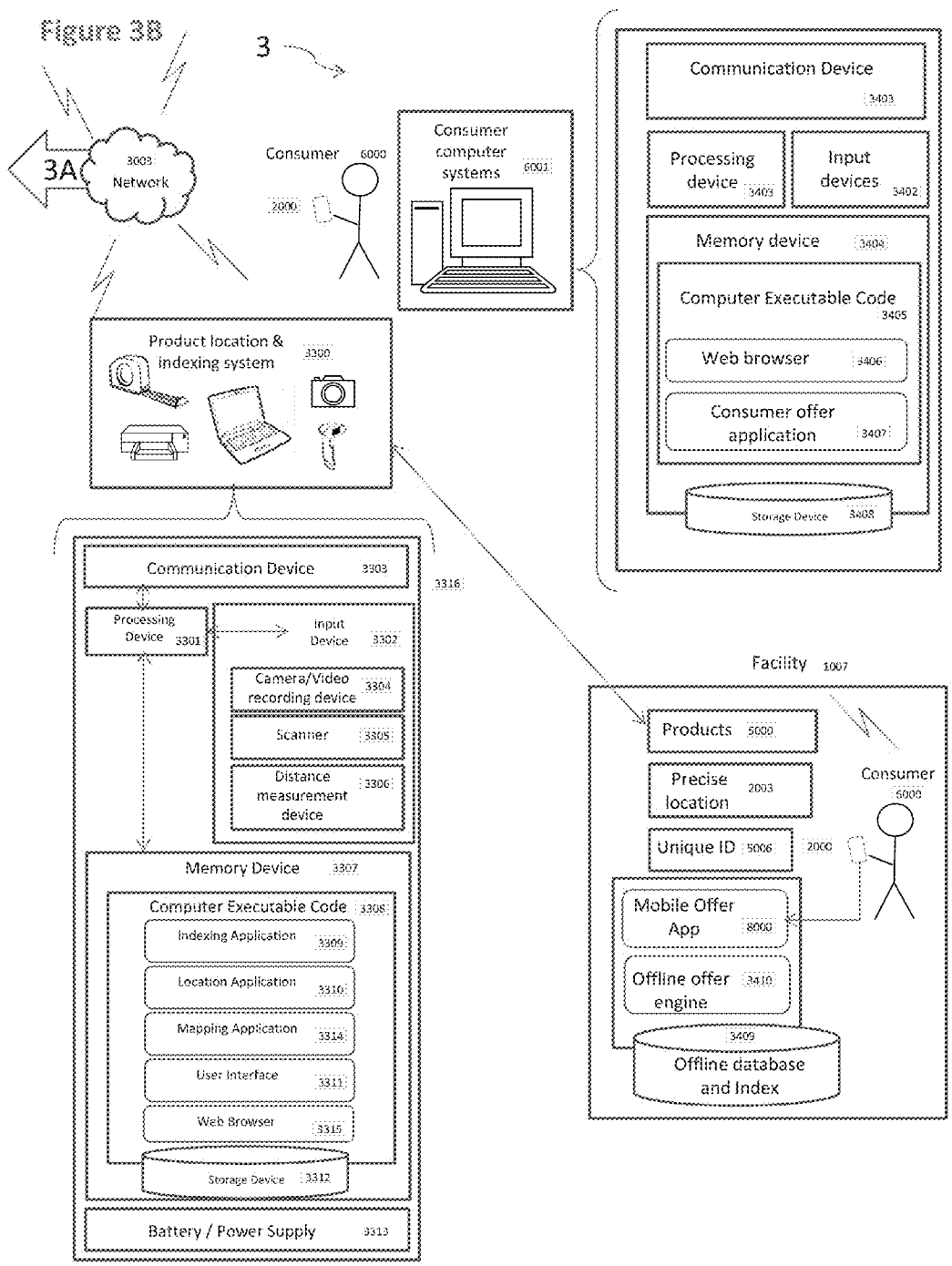

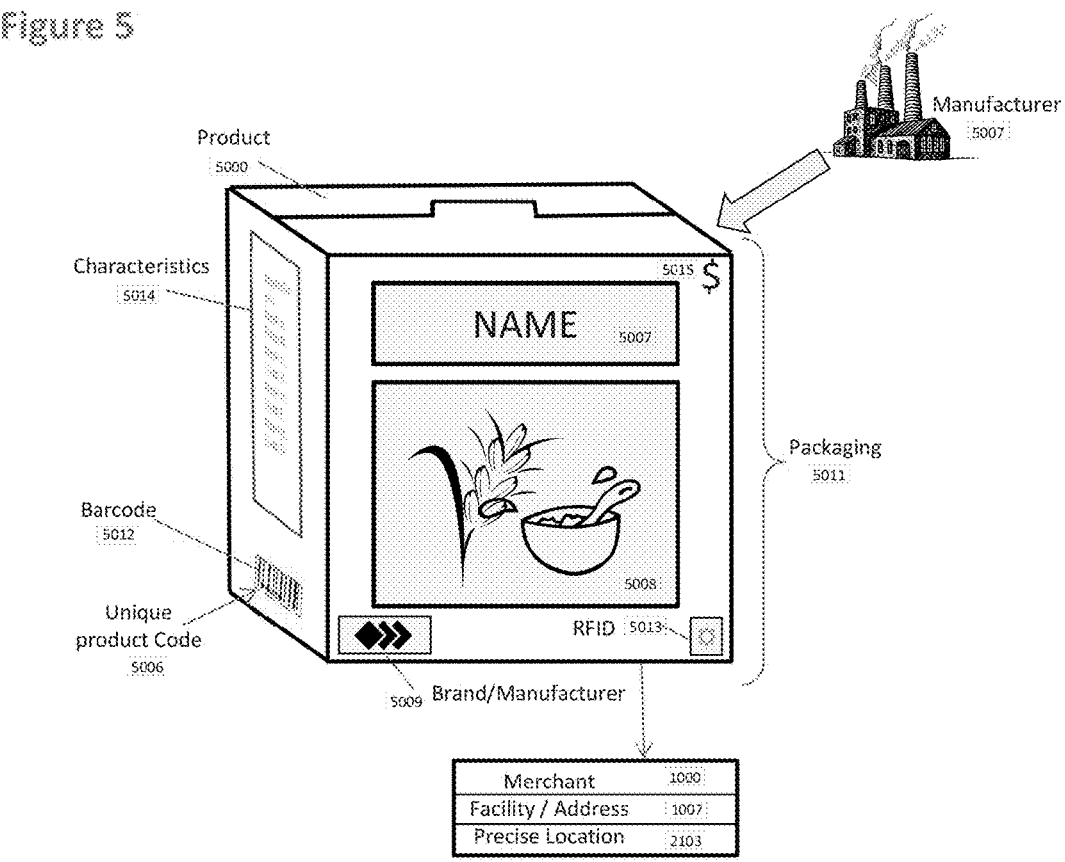

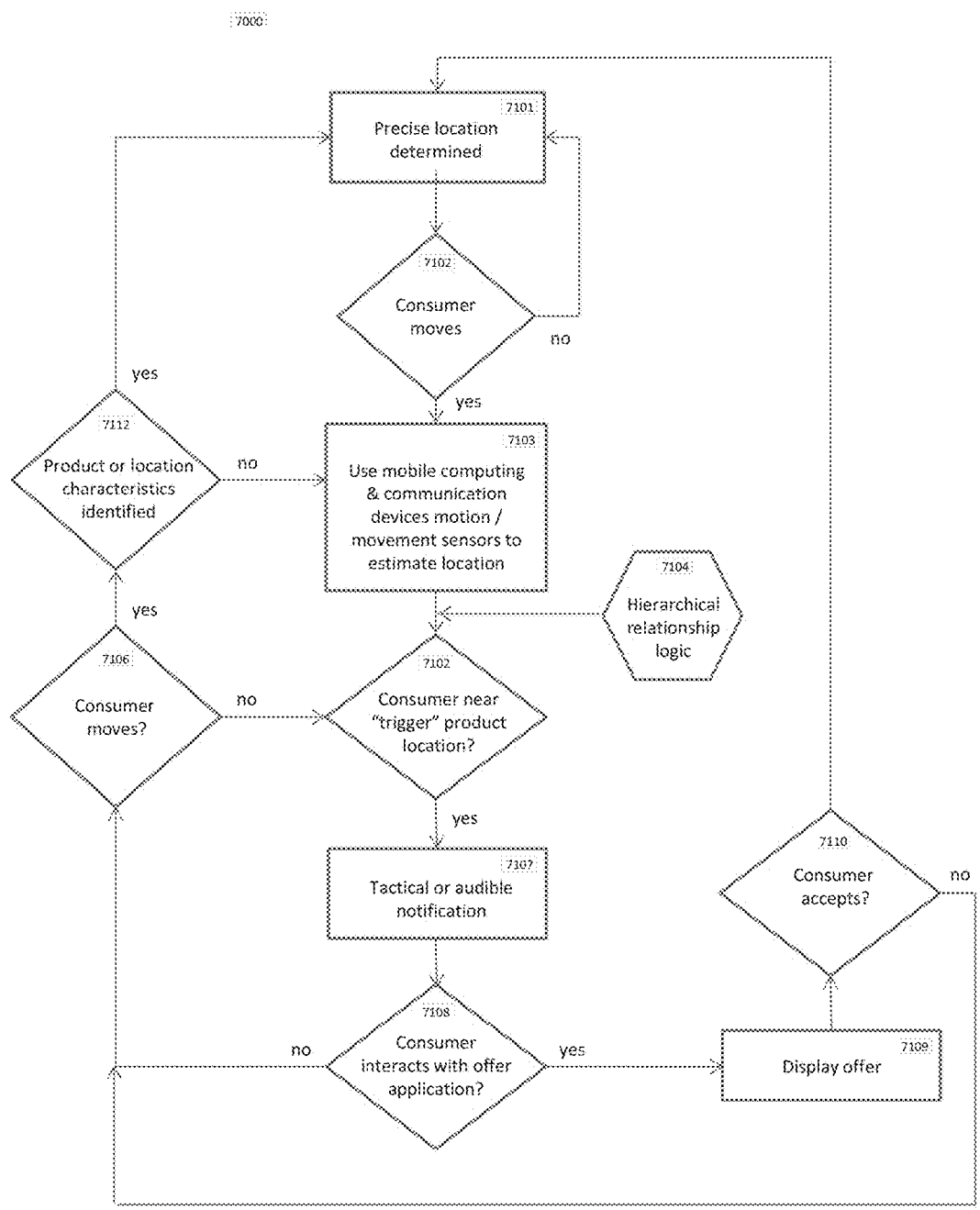

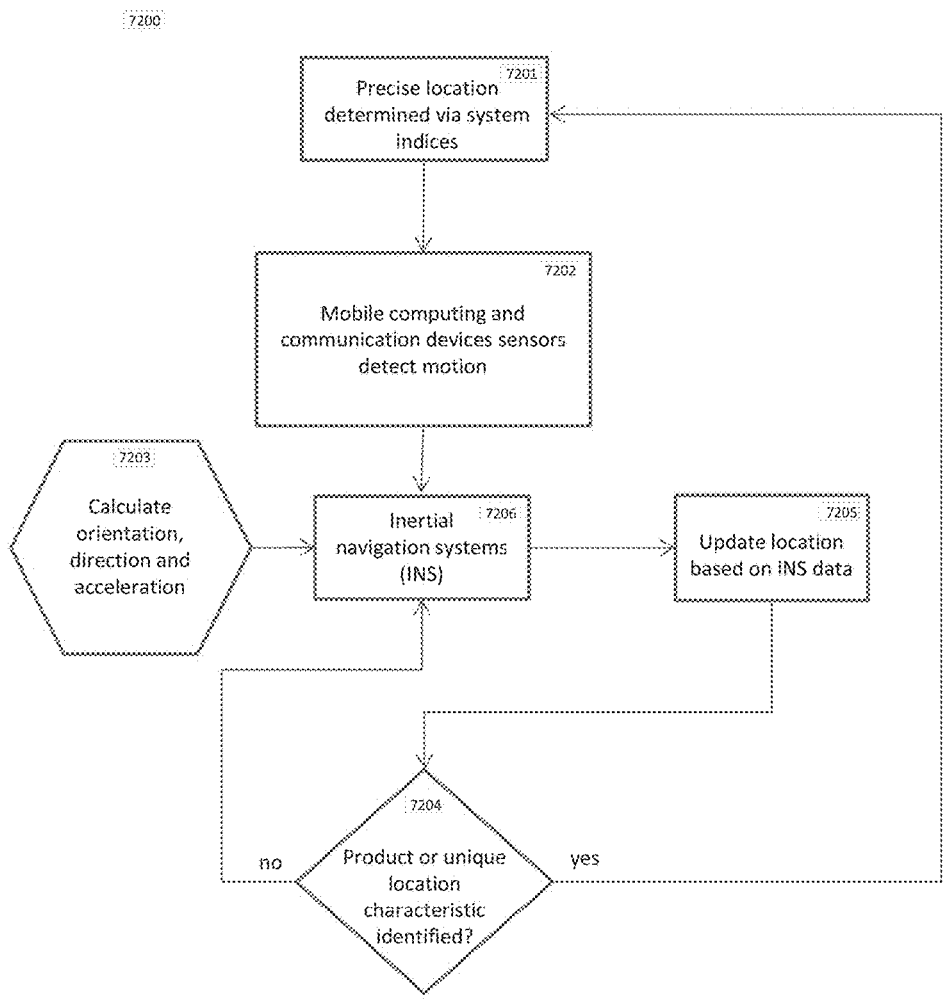

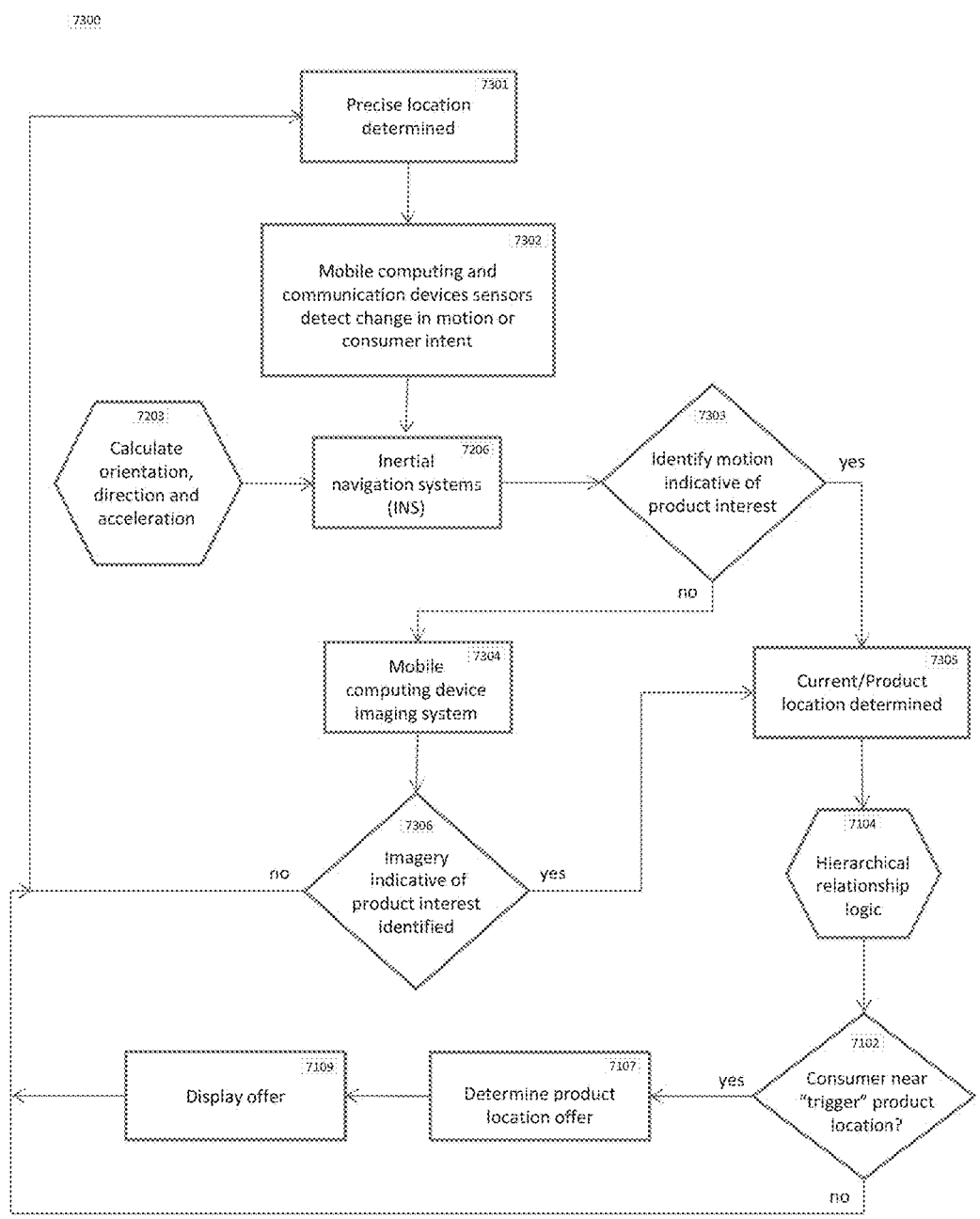

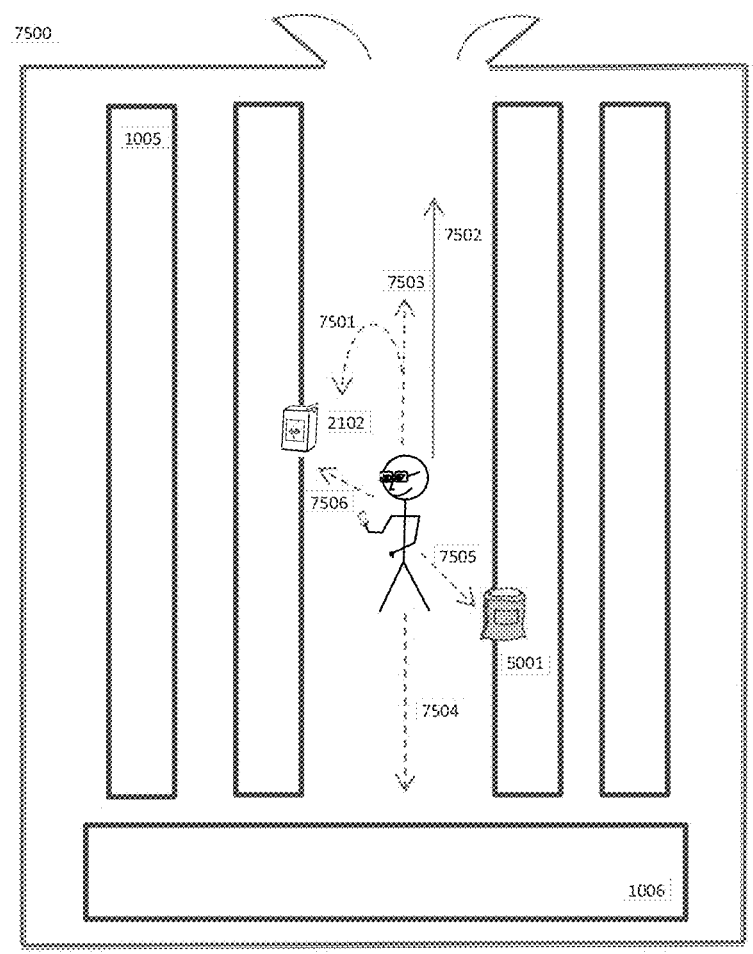

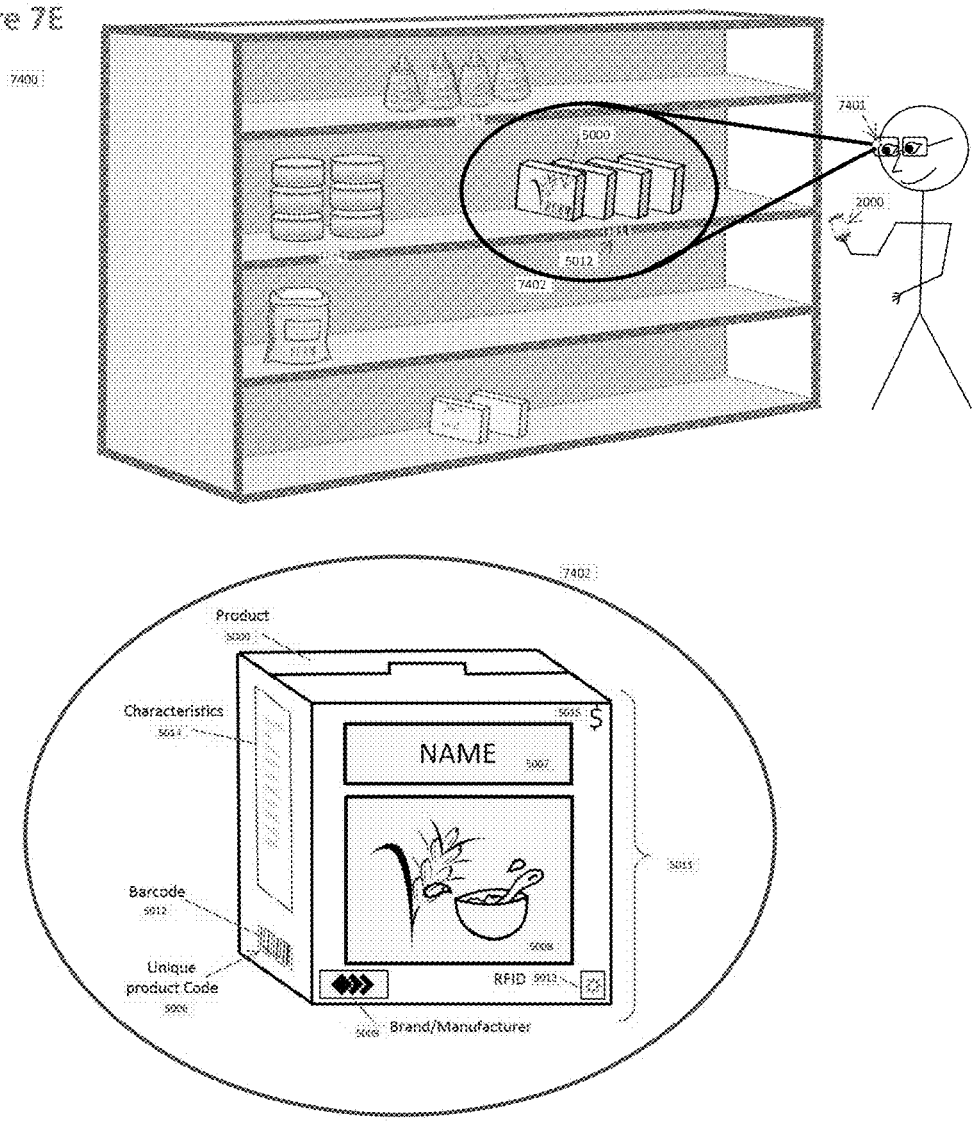

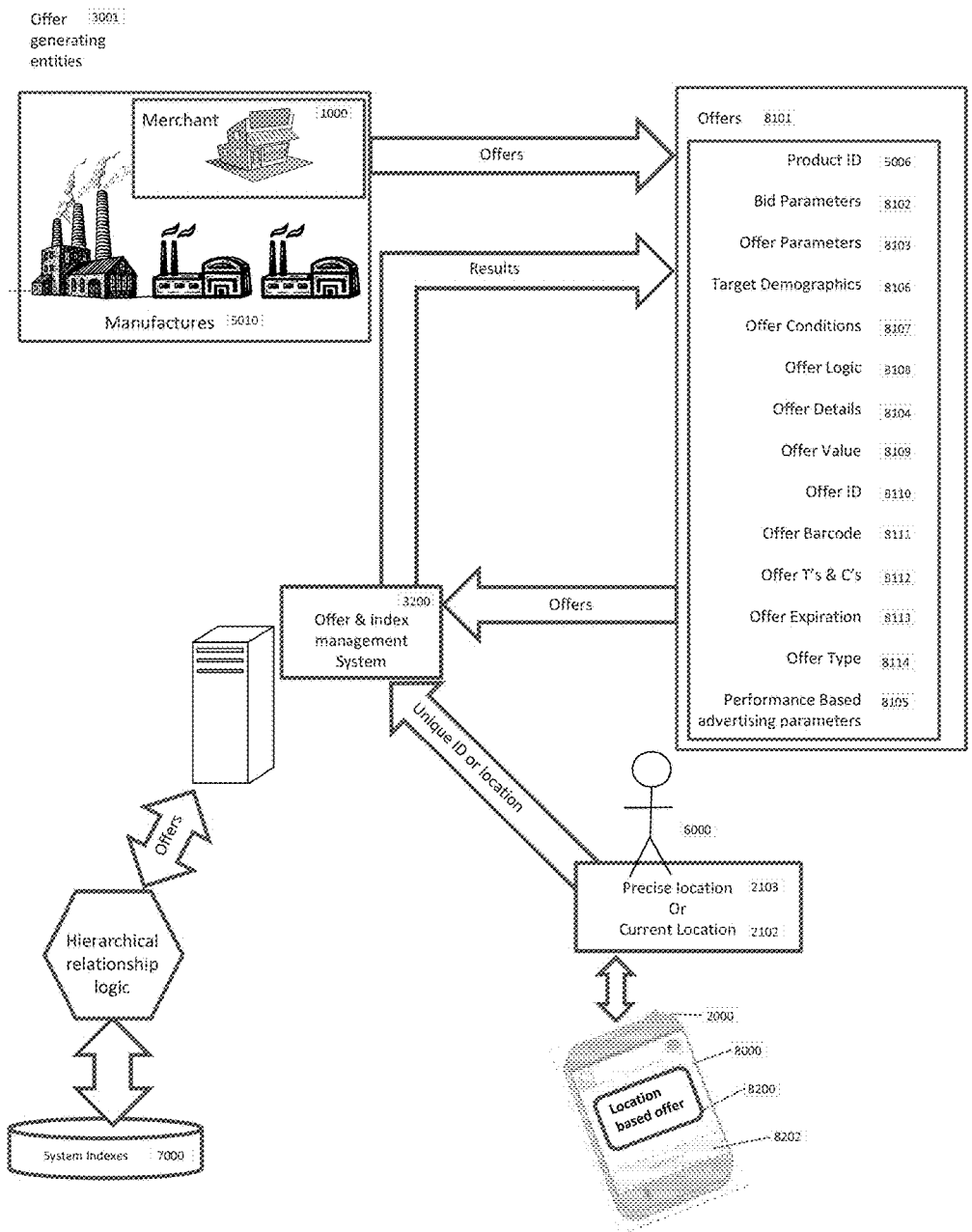
Figure 8A (Determine offer)

Figure 8B    CPA Offer Delivery
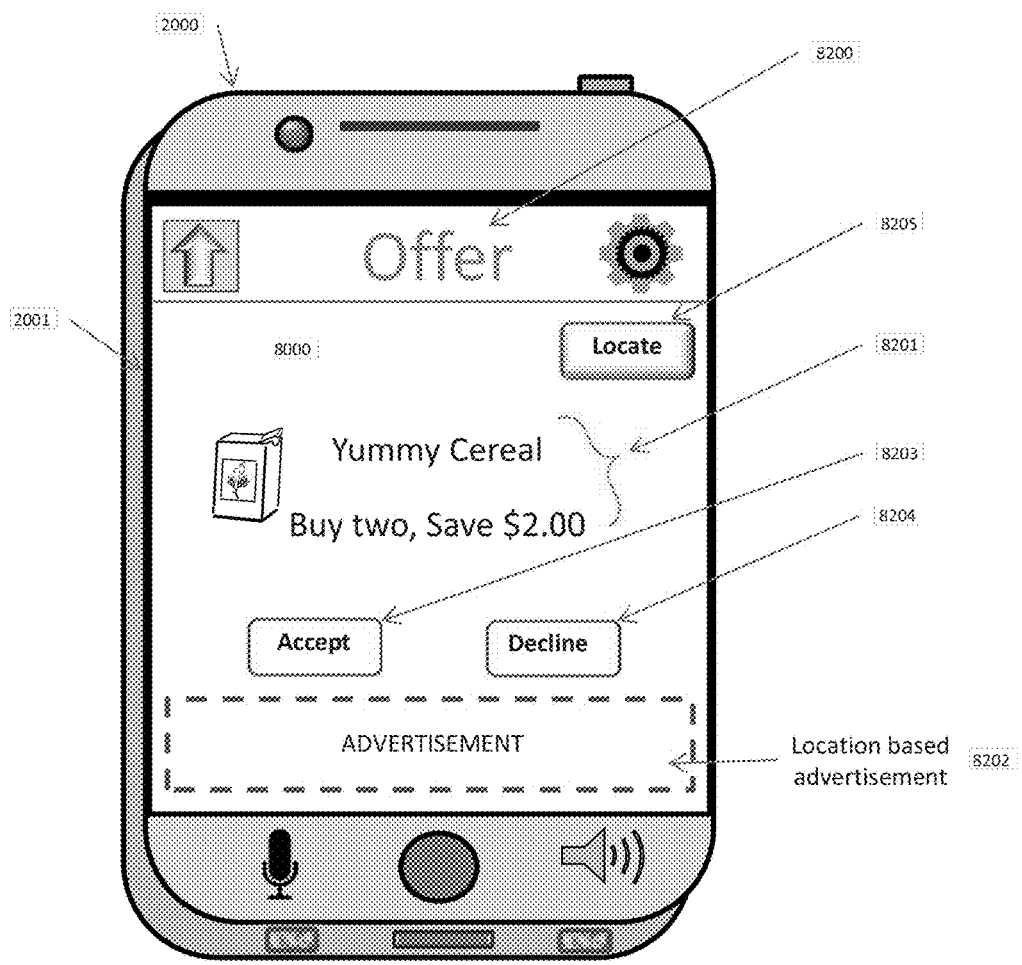

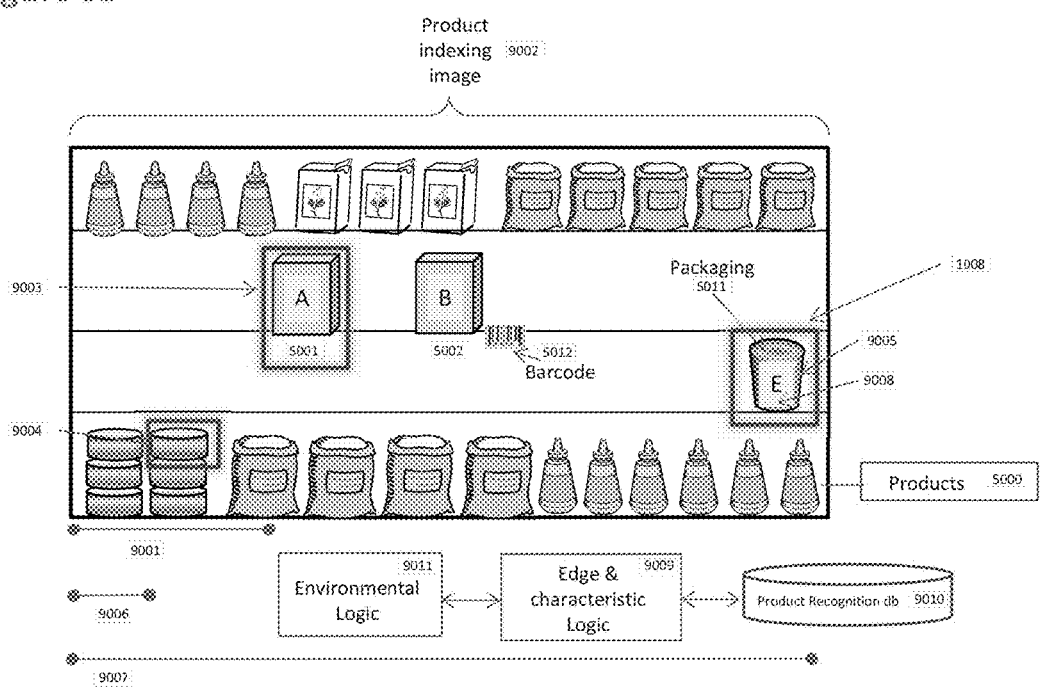

Figure 9C  Flow diagram of product indexing processing
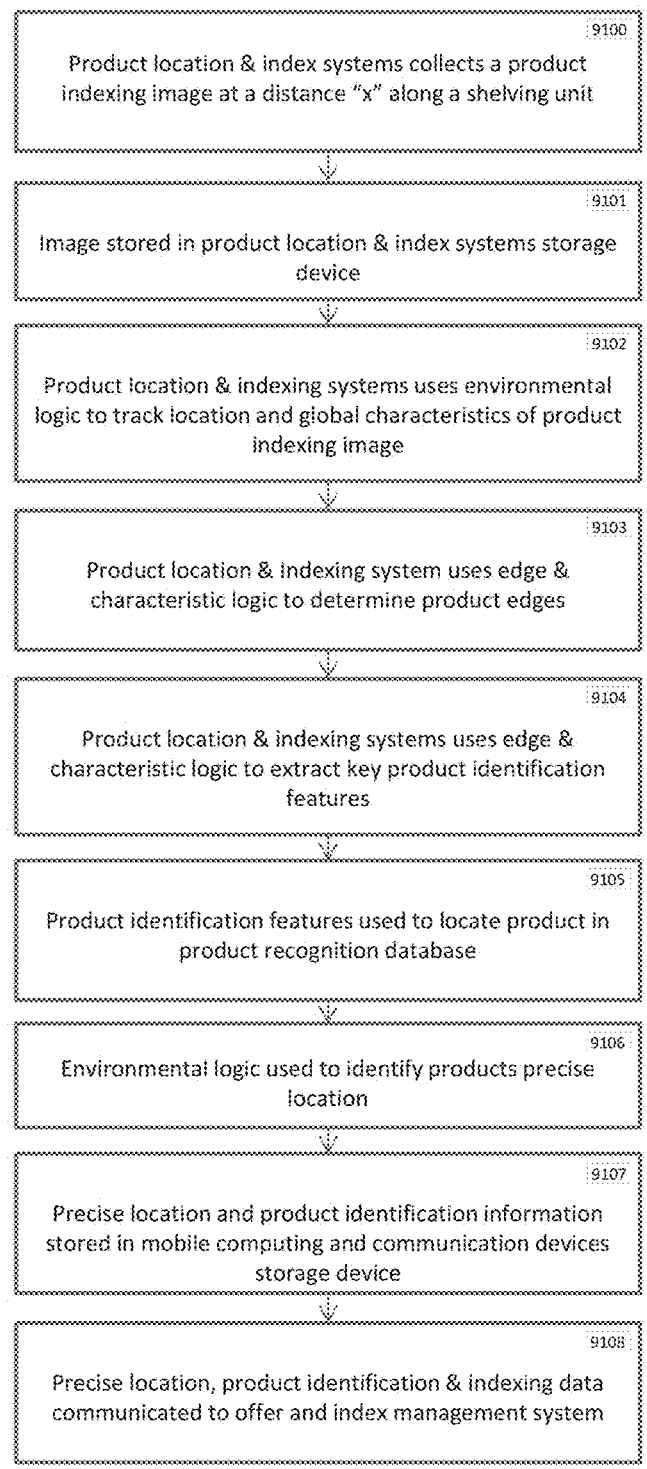

SYSTEMS AND METHODS INVOLVING PROXIMITY, MAPPING, INDEXING, MOBILE, ADVERTISING AND/OR OTHER FEATURES

CROSS-REFERENCE TO RELATED APPLICATION(S)

This application claims benefit of and priority to U.S. provisional patent application No. 61/801,062, filed Mar. 15, 2013, which is incorporated herein by reference in entirety.

BACKGROUND

Field

The present innovations relate to systems and methods involving proximity, mapping, indexing, mobile, advertising, such as contextual product offer implementations based on consumer location and purchasing modes, index-based mobile integrated indoor location processing and mapping, integrated index and location-based offer determination/processing, and mobile integrated offer redemption, among other features.

Description of Related Information

Product manufacturers and advertisers provide advertisements in different forms in order to attract or incent consumers to purchase their products. An advertisement is a component of a product promotion and is a form of communication, designed to be used in whole or part, to persuade an audience (consumers, viewers, readers or listeners) to take some action with respect to products, ideas, or services. Examples of traditional advertisements include promotions that are printed and delivered to consumers through the mail or within a newspaper, magazine, flier or other form of printed and distributed media. The advent of wireline and wireless communications networks, including the Internet, has provided advertisers, manufacturers and merchants with new channels and electronic methods for reaching customers and providing information, advertising and offers related to their goods and/or services. Examples of electronically delivered and online advertising include contextual ads on search engine results pages, banner ads, blogs, rich media ads, social network advertising, interstitial ads, online classified advertising, advertising networks and e-mail marketing, including e-mail spam. Many of these types of ads are delivered by an ad server and are based on demographic and consumer information collected by the advertising entity.

An advertisement may include a promotional offer or incentive (e.g., a coupon, rebate, time sensitive discount, cross selling discount or other discount, etc.) to encourage the consumer to purchase a particular product or service or not purchase a competitive product or service. The presentation of an advertisement to a consumer, or simply the inclusion of a promotion through some form of physical or electronic media can be called an impression. If the consumer purchases the advertised product or service or decides not to purchase a competitive product in response to the advertisement, it can be called a conversion. A conversion is said to occur when a user consummates a transaction related to a current or previously served advertisement. What constitutes a conversion may vary from case to case and can be determined in a variety of ways. The greater the number of conversions relative to the number of advertisement impressions, the more effective the advertisement or promotion is.

In addition to contextual targeting, advertising can be targeted based on a consumer's behavior. This practice is known as behavioral targeting. For example, if a user is known to have recently visited a number of automotive shopping/comparison sites based on analysis enabled by cookies stored on the user's computer, that user can then be served auto-related ads when they visit other, non-automotive sites. However, both traditional and electronic, sales and marketing campaigns are often not as effective as they might be, because they often provide the consumer with advertisements or offers that the consumer is not interested in, or alternatively provide the consumer with advertisements or offers for products they are interested in, but at the wrong time to convert the interest to a sale.

In many cases, a merchant or manufacturer spends resources to send advertisements or promotions to a wide range of recipients without the ability to specifically target consumers interested in the specific products or services they are offering. A good example of this would be a coupon circular in a newspaper or a coupon pack mailed to a particular market. These traditional methods have many disadvantages including, but not limited to, the inability to specifically target end consumers and/or the exact product or service, low conversion rates, significant overhead and high costs.

Additionally, many advertisements and promotional offers are received by the consumer when they are not in an active purchasing mode or cannot take action with regards to the advertisement or offer. Offers such as coupons or rebates often require the consumer to plan ahead and/or collect physical or electronic media in order to take advantage of the offer when they are in an active purchasing mode. Furthermore, consumers may physically receive, through traditional means, or locate merchant or manufacturer's offers on the Internet for goods or services they intend to purchase, but fail to locate desired products at the specific merchant location, hereinafter "facility", within which they are shopping; even when the goods or products desired may be located in close proximity to them. These scenarios result in discounts or promotions that are not utilized and in consumers, merchants and manufacturers not receiving the benefit of such discounts or promotions.

It is generally accepted that the best time to deliver an advertisement or promotional offer for a product or service is when the consumer is in an active purchasing mode for that specific, alternative or related products (e.g., cross-ruff, competitive, etc). Industry data shows that conversions during the active shopping mode are 5 to 10 times more effective than indirect methods. Additionally, a consumer is also more likely to be influenced by an advertisement or promotion when the product or service is in immediate proximity to them and convenient to purchase or take action on.

Current methods for delivering advertising and offers based on a consumer's interests and location are mainly limited to macro locations (i.e. a mall, store or outdoor location determined by GPS or other methods available on a mobile device). Existing methods do not exist to narrow the customer's location down to an actual row, position in a row, or specific product in a row while shopping. Additionally existing methods do not work in indoor locations with enough granulation to provide meaningful location information for proximity marketing.

There is a need to develop apparatuses and methods to facilitate advertisers in providing targeted sales advertisements and marketing offers to consumers based on the exact consumers' location, including precise indoor locations within a merchant facility, the products and alternative products of immediate interest to the consumer, the consumers active shopping or purchasing mode and historical, demographic and product preferences of the consumer. There is also a need to provide consumers' the ability to easily and quickly find products within a merchant that they are or have previously expressed interest in purchasing or receiving promotions for.

BRIEF DESCRIPTION OF THE DRAWINGS

The foregoing brief description as well as further objects, features, and advantages of the present innovations will be understood more completely from the following detailed descriptions of illustrative and non-limiting implementations, with reference being had to the accompanying drawings, which are not necessarily drawn to scale or inclusive of all embodiments.

FIG. 2 illustrates macro location determination of a merchant facility and precise locations within such facility, in accordance with one or more aspects consistent with the innovations herein.

FIG. 3A provides a block diagram illustrating the operating environment of a location and product based offer system, in accordance with one or more aspects consistent with the innovations herein.

FIG. 3B provides a continuation of the a block diagram illustrating the operating environment of a location and product based offer system, in accordance with one or more aspects consistent with the innovations herein.

FIG. 5 illustrates the important characteristics of a product as used, in accordance with one or more aspects consistent with the innovations herein.

FIG. 7A provides a block diagram illustrating the relationship between a consumer's current location, precise location, and movement with offer selection, delivery, notification and acceptance, in accordance with one or more aspects consistent with the innovations herein.

FIG. 7B provides a block diagram illustrating the calculation and maintenance of a current location, beginning from a known precise location, through incorporation of movement data provided an inertial navigation system, in accordance with one or more aspects consistent with the innovations herein.

FIG. 7C provides a block diagram illustrating a process to determine consumer interest in a product location, in accordance with one or more aspects consistent with the innovations herein.

FIG. 7D illustrates a consumer's motions, as detected by a mobile device, which indicate interest in a product location, in accordance with one or more aspects consistent with the innovations herein.

FIG. 7E illustrates a consumer's mobile computing device capturing digital imagery, which indicates interest in a product location, in accordance with one or more aspects consistent with the innovations herein.

FIG. 8A provides a block diagram illustrating a bid and offer parameter process for location based offers, in accordance with one or more aspects consistent with the innovations herein.

FIG. 8B illustrates the presentation of a location based offer, in accordance with one or more aspects consistent with the innovations herein.

FIG. 9B illustrates a representation of a product indexing image, in accordance with one or more aspects consistent with the innovations herein.

FIG. 9C is a flow diagram further describing illustrative product indexing processing, in accordance with one or more aspects consistent with the innovations herein.

OVERVIEW OF SOME ASPECTS

Figure 1A:
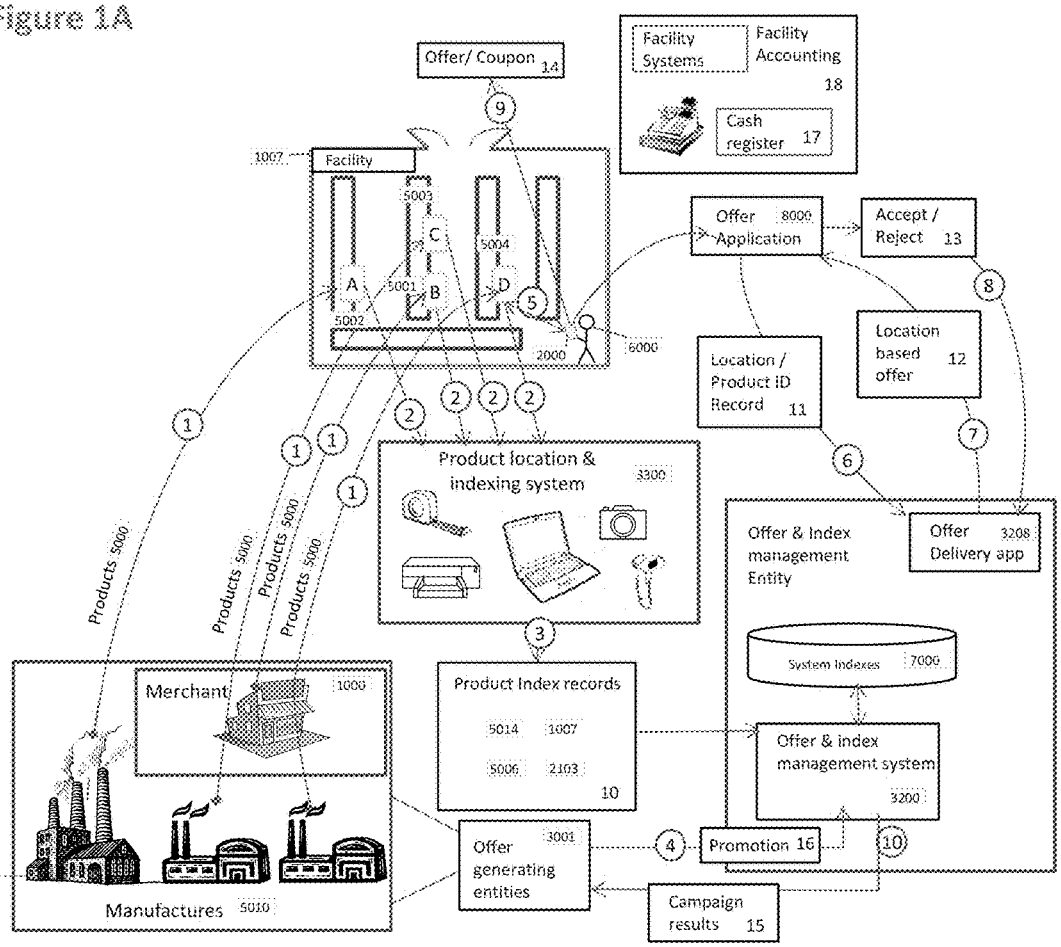
FIG. 1A provides a diagram illustrating the basic processes for a location and product based offer system, in accordance with one or more aspects consistent with the innovations herein.

One advantage/feature of aspects of the systems and methods herein is to sell the delivery of (manufacturer and/or merchant) advertising and/or offers (for a plurality of products) to end consumers on a contextual basis; determined by a consumer's exact location in a store/business/mall and the products they are currently buying, and/or products they are near, the consumer's location specific and/or historical purchasing habits, contextual/demographic information and competitive or cross reference products related to the products the consumer scans to show interest in buying. A core piece and enabling factor of certain implementations, here, may be a location vs. product index/database created for a plurality of stores. This location based index may be utilized to provide a variety of innovative aspects over existing methodologies. For example, other existing methods may involve scanning a product and getting offers for that product from the merchant the consumer is shopping in or from alternate merchants online or nearby. However, such methods do not cover/address the manufacturer of the products. In contrast, systems and methods herein that involve location based index offer innovations allow both merchants and manufacturers to present marketing information and offers to consumers based on their location and related goods etc. at their location. This enables a manufacturer or merchant to present offers that are related to or nearby the consumer. Without the location information, such targeting would not be possible.

Indexing and associated processing herein may utilize the same technologies that search engines use to index the Internet or large and complex databases use to provide fast contextual lookups of specific and interrelated data. Further, the index/database may be continually updated with the specific locations of all products in a particular store(s) (i.e. their exact location(s) in different rows and areas) and the products identifying information. Examples of information in the index would include UPC codes, other scan-able codes, product specific information, manufacturer/merchant information, product offers, product relationships, marketing information, etc. The index information for a particular store can be maintained/updated by the store or a third party that is indexing the store.

An exemplary indexing process of a store may include, but is not limited to, gathering the following information: the physical location of the store (i.e. address, GPS coordinates, building, floor, etc.), the interior dimensions of the store, the location(s)/layout(s) of rows and/or product displays within the store, the dimensions of the rows and displays throughout the store, row/display specific information (i.e. row number, store directory information for the row, row/display type, etc.), product locations within a specific row/display (i.e. distance from beginning/end of the row, shelf location, end cap, etc.), amount of space taken by the product (e.g. 3 feet long on 2 shelves or 3 products long on shelf #4), product identification information (UPC, other product identification data, etc.), product price, "Row View" (Picture of the product on the shelf/display—similar to "street view" in mapping applications on the Internet) and date/time. Additionally scan-able codes or tags can be placed throughout a store and used to identify a specific location in a store.

In some implementations, the indexing process may use a customized computing and communication device, such as one that is built into a shopping cart or carried by an individual indexing a store/location. This device may incorporate elements such as a processing/computing device, product scanner(s), camera(s), a communication device, batteries, memory/storage, a measurement device that optionally keeps track of where the scanned product is relative to the measurement start point, a user interface, and/or a display.

Exemplary indexing processes may also use manual customer input to create the index. Here, for example, such manual input may involve entering or updating information in the index such as: row number, shelf number, length from start of row, product ID (UPC), length of product space, product price, date/time, etc. Such processes may entail having the store's layout and logistical information entered previously providing the indexer the ability to create/modify a layout manually.

Various other innovative implementations herein involve aspects that provide for manufacturers and/or merchants to enter or bid for offers/promotions to be served to the consumers through the various interface mechanisms. According to various embodiments herein, manufacturers/merchants may use an application provided by the system to enter information for promotions, advertisements, coupons, etc. for their products. Certain embodiments may also allow them to enter in competitive products, complimentary products, or locations in a store where special offers, advertisements or competitive offers are presented. In some implementations, the manufacturers/merchants may bid amounts, impressions and/or conversions they want per product or store or etc. based on a plurality of factors (i.e. cost per impression, cost per conversion, cost per competitive churn conversion, cost per day, impressions per day, etc.) Here, for example, such bidding processes may be similar to technologies used today in search engines and on the internet for providing adwords, banners, popups, etc. Further, the associated offer database may be incorporated in the same database as the product location index or may be a separate database that is relationally connected to the product location index.

A central component of various product location index implementations is the consumer's mobile computing device which is used to determine the products that a consumer is near in an indoor location. Alternatively, a consumer may checkout a mobile location device at the store. Such device may be used by the consumer to scan the products they are interested in purchasing, which are then used to identify their location in the store, product preferences and shopping habits. If the device has other indoor location capabilities, this can be used instead of product scanning. The mobile computing device can be a consumer provided device (i.e. smart phone, iPad, laptop, tablet, etc.) capable of identifying a product with its camera or a built-in or external product scanner. In some implementations, the identified product is then referenced against the product location index and other factors to identify the consumer's location in the store. The consumer mobile device may also connect to an external product scanner used to identify a product and the subsequent location of the consumer based on the product location index. Other implementations to determine the consumer location may involve a mobile communication and product identification device that is purchased or checked out at the store and used by the consumer while shopping. Alternatively this functionality could be built into a shopping cart. If equipped, the mobile computing devices accelerometer or other motion and acceleration sensing capabilities can be used to estimate movement from a previously identified location. This allows offers to be presented, even when a product hasn't been scanned to update a consumer's location. It also allows the consumer's progress through a store to be mapped.

Additional components of the above systems and methods may include the consumer database, offer delivery application & device(s), and offer redemption process and device(s).

In some implementations, a consumer will sign up for an account with the system/service in order to use it and receive merchant and manufacturer offers while shopping. When a consumer signs up for an account, specific information about them is stored in the consumer database and may be used, in part, to deliver offers to them while they are shopping. This consumer database may be incorporated in the same database as the product location index and/or offer database or may be a separate database that is relationally connected to the other indexes and databases. Here, for example, the system may collect demographic information about the consumer, their product preferences, shopping lists, frequented stores, shopping habits, product savings, etc.

Systems and methods herein may include or involve a mobile offer deliver application, which may be a program that is downloaded and installed on the consumer's mobile computing device. This is the application and GUI that allows the consumer to interface with the system and receive offers as well as scan products (or codes placed within rows) to determine their location. While a consumer is shopping they scan items as they place them into their cart or to indicate their location. Scanning could consist of using the devices camera, a bar code reader, RFID, etc. If there are offers near them that meet their product preferences or are targeted to them by the manufacturers or merchant, they will be presented with offers and/or marketing information. If they choose to accept or reject an offer, they may select the appropriate indicator in the user interface GUI. The user interface GUI will also show their location in the store and even allow the consumer to manually select their location in the store.

In addition to the application features used while shopping, system and methods herein may include additional features that allow the consumers to see their savings, choose their offer and marketing preferences, select "favorite" products so they can be notified when offers exist for those products, enter shopping lists, select recipes that will populate their shopping list with the required ingredients, scan product as they are consumed so they are added to their shopping list and marked on the offer watch list, see and edit their inventory of products/groceries on-hand, share and compete with their 'friends' through social networking, win prizes and incentives based on their product savings, etc. The consumer features of the system can be accessed through the application loaded on their online device or via a web interface on any compatible device connected to the Internet.

A unique feature of embodiments of the user interface is the indoor mapping and routing feature of the application. Here, when the consumer is shopping the application will map out a suggested course through the store to get the products on their shopping list. Their location is updated based on the products they scan and the motion and acceleration detection features of their mobile device. The device could also use wireless signals such as Bluetooth or WiFi to find and maintain their indoor location. There may also be audio and visual indicators when the consumer is close to the products on their shopping list or ones that were added based on offers while shopping or for offers targeting them from the merchant or manufacturers. The application can display a picture of the product the consumer is looking for related to the offer they accepted. The picture can be the "Aisle View" and or a picture of the product.

While shopping a consumer may enter a specific product they intend to purchase or search the store for a product with key words similar to using a search engine on the Internet. Additionally the consumer can get a list of the 'best' deals available in the merchant facility at that time and get a list of the general or targeted offers for them. These impressions can be selected and added to the consumers shopping list. The application may also use its indoor mapping feature to direct the consumer to the selected offers.

Another element of certain systems and methods herein is the offer redemption component or process. Here, there are several mechanisms for the consumer to cash in the offers they accepted. While shopping, if they accepted an offer, the consumer may choose the appropriate acceptance indicator in the GUI, scan and place the product in their cart. If the merchant has a consumer loyalty program that allows coupons to be electronically loaded to their systems, the offers would be automatically loaded into the merchant's loyalty program and deducted during checkout automatically. If this is not possible, the offers will be displayed on the screen of the mobile computing device and scanned individually by the checker during checkout like a typical coupon. If the merchant or manufacture requires a hard copy of the coupon there are a few methods to accommodate this. The system can transmit the coupons to the store where they are manually printed to be cashed in with the manufacturer. The merchant can have a coupon printing station in the store where the consumer will go to print their coupons. The consumer would login to the station and choose to print their offers. The offers will print much like select coupons are printed today during checkout. Finally if the offer is a rebate or mail in type of offer the consumer will have the ability to print it at home to then manually send it to the manufacturer for redemption.

Systems and methods herein may also have a "competitive" aspect with ties to Social Media. Here, for example modules may facilitate friendly competition between friends, e.g., for most savings, most % of savings, and the like. Such applications may include news feeds about how much you saved, etc. Further, they may be configured such that an advertiser pays to have their products mentioned in a news feed.

To encourage use, the application may include kickbacks to the consumer. For example, a consumer may get money back after using X coupons for Y shopping trips, or for referring friends. Additionally, implementations may randomly select X number of shoppers every day and they get a refund on all scanned items they bought during a qualifying shopping trip. Here, for example, every scanned item gets an entry in such random drawing.

Additionally, various implementations may include or involve information about "coupon codes" that a person can enter into their app. Such implementations may include the ability to scan a code from a commercial or advertisement or get an alpha-numeric code that can be entered manually. These coupon codes may be used like QR codes in magazines, and tie in with the coupon functionality set forth elsewhere herein.

Systems and methods herein may also allow consumers to load traditional or electronic coupons into the application. Such systems and methods may be tied to advertisers, as well; here, for example, implementations may provide a "per customer" service to advertisers for coupon distribution. Embodiments, here, may link to Twitter and other Social Media sources, and gives advertisers real feedback as to the effectiveness of an advertising campaign.

Various implementations herein may utilize specialized user interfaces and GUIs. Here, for example the application display space may be divided or organized according to the functionality in use or desired by the user, e.g., part of the display for shopping, part of the display for offered deals, etc. In some implementations, another part of the display may for advertisements with delivery of advertisements based on a "ranking" determined by known data, such as targets demographics, habits, appeal, relevance, interest, etc.

Systems and methods herein may also include or involve recipe aspects, such as features that also tie back to the advertisers. Here, for example, advertisers may pay for a service where recipes that use their products are delivered/served to the consumers based on their requests, purchasing habits, favorite foods, etc. Additionally, meal ideas can be advertised to consumers while shopping, while using the online application and/or by email.

One illustrative shopping implementation is described below. A set of products in a merchant store are indexed. Indexing is performed by the store or by the institution offering the offer redemption service. Indexing may be automated by using a video or picture based system that also tracks movement through a store and uses image recognition of products.

Various manufacturers may bid amounts against each other for the display of their product offers to the consumers while shopping. Multiple bid methods may be employed and are not limited. The manufacturer may choose a multitude of factors to determine to whom and under which conditions their offers are presented to a consumer.

Next, a consumer may load the product offer application on their mobile computing device and enter their product and marketing preferences. The consumer may optionally enter a shopping list or track the products consumed within their households to add to their shopping list. A consumer may also use a web application on their hope PC to enter preferences, shopping lists and select recipes.

When the consumer launches the shopping application, the application will receive the store location from the mobile computing devices location information. If a location isn't available, the consumer may choose the merchant for a list or scan an indicator in the merchant facility to identify it.

While shopping, the consumer may scan products as they add them to their cart for purchase. This information is used to determine the consumers location while shopping based on the product location index of the store. Scanned products are used to track a consumers product preferences and shopping habits. As the consumer moves without scanning products, their location is estimated using the motion and acceleration functionality of the mobile computing device. A consumer can also periodically scan a location's unique visual characteristics in a store to update their location.

Based on the consumers location, product preferences, shopping habits, as well as the marketing and offer information and bids from the merchant and manufacturers, the consumer may be presented an offer while they are shopping (referred to hereinafter as an impression).

The consumer will determine if they accept the offer or reject it. The accepted offer may be for the product they just added to their cart (referred to hereinafter as a conversion). The accepted offer may be for a cross-ruff or related product which they can and add to their cart at a later time to receive the offer. If the additional product is in another area of the store, the consumer may be provided directions to the accepted offers product location and may receive a visual and/or audio indication when they are near the product location. The accepted offer may be for a product that competes with the product just added to their cart. The consumer may choose to remove the recently added item (referred to hereinafter as a competitive churn offer acceptance) or the consumer may choose to purchase the competitive product without removing the original product (referred to hereinafter as a competitive conversion).

The offer may be marketing or advertising information. If the consumer views the information presented it is an impression. If the consumer subsequently adds one or more products related to the information presented it is referred to as a conversion.

When the consumer is done shopping they may redeem their offers via the following methods: automatically adding them to their merchant loyalty card; printing them locally in the store; and, scanning them from the display of their mobile computing device during checkout.

After shopping, the consumer may be presented with their total savings and the potential savings they could have achieved if they accepted all offers. The consumer may compete with their friends via a social network for the greatest savings and savings percentage and for the number of products scanned during shopping. The consumer may enter their information into prize competitions based on their savings and saving percentages and for the number of products scanned during shopping.

DETAILED DESCRIPTION OF ILLUSTRATIVE IMPLEMENTATIONS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a marketing and advertising institution, one of ordinary skill in the art will appreciate that the invention may be utilized by other businesses that take the place of or work in conjunction with marketing institutions to perform one or more of the processes or steps described herein. For instance, in some embodiments an entity that acts as a clearing house for offers could take the place of the marketing and advertising institution in whole or in part throughout this application.

FIG. 1A illustrates a location and product based offer system in accordance with one exemplary embodiment of the present invention. FIG. 1A illustrates steps involved in delivering location based offers to a consumer 6000. As illustrated in FIG. 1A, the first step in the process is the production of and delivery of products 5000 from manufactures 5010 or merchants 1000 to a merchant facility 1007 where they are offered for sale to consumers 6000. A merchant sales facility 1007 is typically stocked with products 5000 from a plurality of manufacturers 5010, which are logically distributed throughout facility 1007 in a hierarchical order based on product type and category and depicted by products 5001, 5002, 5003 & 5004.

The second step, as depicted in FIG. 1A, is to index the location of all the products 5000 in facility 1007. This is done by or for the offer and index management entity 3002 by utilizing a product location and index system 3300. The product location and index system 3300 creates product index records 10 which are communicated to an offer and index management system 3200 managed by the offer and index management entity 3002. A product index record 10 may be communicated over a network 3003, using industry standard protocols as described throughout this disclosure, and may include information elements communicating the facility location 1007, unique product code 5006, precise product location 2103, product characteristics 5014 and additional metadata. Step 2 of FIG. 1A depicts utilizing product location and index system 3300 to create product index records 10. This active indexing process is not the only method that can be employed to create product index records 10, therefore, systems outside of what is described herein may be utilized to extract, create, extrapolate and/or communicate all or portions of a product index record 10.

The offer and index management system 3200 is operatively coupled to system indexes 7000. As product index records are received and processed by the offer and index management system 3200 they are stored, modified and/or updated in the system indices 7000.

As further depicted in FIG. 1A, manufacturers 5010 and merchants 1000 utilize internal or external marketing and advertising firms, referred to as offer generating entities 3001, to produce and distribute marketing materials, offers and advertisements for their products 5000. Step 4 of the process involves the offer generating entities creating offers, promotions and or advertisements for their products 5000. The offer generating entities 3001 interface with the offer and index management system 3200 and create promotions 16 for select products 5000. According to some embodiments of the present inventions, the promotions created may include one or more digital coupons 8201 and/or location based advertisements 8202, herein referred to as "offers".

FIG. 1A additionally illustrates a consumer 6000 shopping in a merchant 1000 facility 1007 while using a mobile communication and computing device 2000. As illustrated, consumer 6000 operates an offer application 8000 on their mobile communication and computing device 2000 to communicate location determining information to the offer and index management entity 3002. In the embodiment depicted in FIG. 1A, step 5 shows the consumer 6000 scanning a barcode 5012 on product "B" 5001 with the offer application 8000 to identify the product 5000 and check to see if any offers exist in their immediate proximity. The unique product code 5006, extracted from the barcode 5012, and is communicated in a location/product ID record 11, step 6, to the offer delivery application 3208 managed by the offer and index delivery entity 3002. Alternately, in another embodiment the consumer 6000 may visually identify the product by using unique characteristics of the product 5000 packaging 5011 to identify it instead of electronically reading its barcode 5012.

The offer delivery application 3208 is operatively coupled to the system indexes 7000 and offer management applications 3207 within the offer and index management systems 3200. The offer delivery application 3208 uses the location/product ID record 11 to determine the consumer's 6000 precise location 2103 in the merchant 1000 facility 1007. The offer and index management systems 3200 use the consumer's precise location 2103 in combination with hierarchical relationship logic 3026, offer parameters 3013, and/or consumer 6000 demographics to determine location based offers 12 or advertisements to serve to the offer application 8000, as depicted in step 7 of FIG. 1A. Offers 12 or advertisements received in the offer application 8000 may be for the scanned product "B" 5001, a nearby "competitive" product "A" 5002, a cross-ruff product "C" 5003, or another unrelated product "D" 5004 targeted for consumer 6000.

As illustrated in FIG. 1A, step 8 depicts a preferred embodiment of the present invention where the consumer 6000 "accepts", "rejects", or "converts" a location based offer 12 or advertisement with the offer application 8000. The consumer's actions are communicated back to the offer delivery application 3208 by the offer application 8000. The offer delivery application 3208 communicates the results to the offer and index management system 3200 where it is stored in the various system indices 7000 and analyzed by the hierarchical relationship logic 3206 and made available via the analytics/analysis application 3213.

FIG. 1A, step 9, illustrates one embodiment where the consumer 6000 proceeds to the checkout counter at the merchant 1000 facility 1007 with a product "B" 5001 and "accepted" location based offer 12 associated with product "B" 5001. During checkout the consumer 6000 presents the offer/coupon 14 associated with the "accepted" location based offer 12 to the cashier. In one embodiment the coupon is scanned into the cash register like a typical paper coupon by scanning the display of the consumers 6000 mobile computing and communication device 2000 while the offer application 8000 is displaying the offer/coupon 14. This active offer redemption process is not the only method that can be employed to redeem offers, therefore, systems outside of what is described herein may be utilized to extract, create, extrapolate and/or communicate all or portions of a plurality of location based offers 12 and or offer/coupons 14. Other embodiments include but are not limited to, the location based offer 12 associated with product "B" 5001 is automatically added to the consumer 6000 loyalty card/program with merchant 1000, the location based offer 12 associated with product "B" 5001 is printed at an offer print station within merchant 1000 facility 1007, the location based offer 12 associated with product "B" 5001 is electronically fulfilled at time of checkout through communications with the offer and index management entity 3002 and offer and index management system 3200.

The final step illustrated in FIG. 1A is step 10, where campaign results 15 are communicated to the offer generating entities 3001 from the offer and index management system 3200. Campaign results 15 include information elements on the success of various offer campaigns. Example of these information elements include but are not limited to, conversion rates, display attempts, demographic analytics, revenue, competitive analytics, page/visits, advertisement displays, etc.

The embodiments in FIG. 1A describe embodiments where network 3003 connectivity exists for all of the various communication steps. This active real time offer creation, delivery and redemption process is not the only method that can be employed to realize a location and product based offer system, therefore, systems outside of what is described herein, including offline data stores, cached systems, cashed information and cloud systems may be utilized to extract, create, extrapolate and/or communicate all or portions of the location and product based offer system.

Figure 1B:
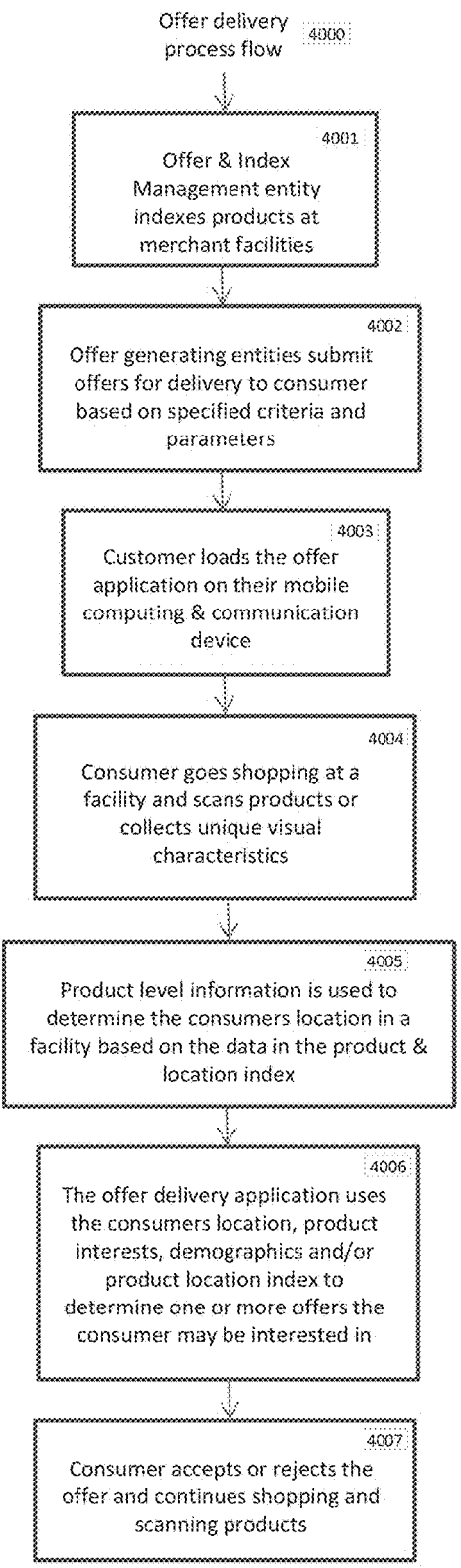
FIG. 1B provides a block diagram of an offer delivery process flow, in accordance with one or more aspects consistent with the innovations herein.

FIG. 1B provides a block diagram of one embodiment of an offer delivery process flow 4000. As illustrated in block 4001, the first step of this general embodiment involves offer and index management entity 3002 indexing products 5000 at a merchant 1000 facility 1007. For example, as discussed later in greater detail, a product location and indexing system 3300 is operated to gather product tag unique IDs 5006 and/or location unique visual characteristics 1011 and determine the precise location 2103 of these items/characteristics within a facility 1007. This data is subsequently loaded into the system indices 7000 of the product offer and index management system 3200.

Block 4002 of FIG. 1B illustrates the offer generation process and involves one embodiment where an offer generating entity 3101 submits offers for products 5000 in a centralized mobile advertising and offer system 3. For example, as discussed later in greater detail, an offer generating entity 3101 uses an offer generation and redemption system 3100 to define offers, which in one embodiment, contain a product 5000 unique ID 5006, offer parameters 3013 and offer details 3012, which are communicated to an offer and index management system 3200, where they are processed and stored in system indices 7000.

Block 4003 and 4004 of FIG. 1I3 illustrates an embodiment where a consumer 6000 loads a mobile offer application 8000 on their mobile computing and communication device 2000 and goes shopping at a merchant 1000 facility 1007, where they use the scanning capabilities of their mobile computing and communication device 2000 and the operatively coupled mobile offer application 8000 to identify product 5000 or unique ID 5006; which are then communicated via network 3003 to a product offer and index management system 3200.

Block 4005 of FIG. 113 further illustrates the embodiment where the product 5000 and or tag level information 5006 is processed by applications on the product offer and index management system 3200 which is operatively coupled to system indices 7000, and, in turn, determines the consumer's 6000 precise location, in part, based on the communicated unique IDs 5006, unique product visual characteristics and/or location's unique visual characteristics 1011.

Block 4006 of FIG. 113 illustrates an embodiment of the offer selection/determination phase of the offer delivery process flow 4000. In this step, offer and index management system 3200 uses a plurality of information at its disposal to select an appropriate offer or choose not to send an offer. For example, in one embodiment, system indices 7000 contain precise locations 2103 of products 5000 with offers, offer parameters 3013, consumer 6000 demographics/preferences/interests, and/or other information elements useful for determining relevant location based offers. The applications running on the product offer and index management system use hierarchical relationship logic 3026 in addition to the products unique ID 5006 and/or location's unique visual characteristics 1011 communicated by the mobile offer application 8000 to determine one or more offers or advertisements the consumer 6000 may be interested in receiving. These offers are then communicated via network 3003 to the mobile computing and communication device 2000 and mobile offer application 8000.

The final step of one embodiment of the offer delivery process flow 4000 is illustrated in block 4007 of FIG. 113. In this embodiment, consumer 6000 accepts or rejects an offer by indicating their desire to the mobile offer application 8000 through the use of a human interface feature available on their mobile computing and communication device 2000 and continues shopping and/or scanning product and/or collecting a location's unique visual characteristics 1011 as described in box 4004.

FIG. 2 provides a diagram illustrating macro location determination of a merchant facility and micro location determination within a merchant facility, in accordance with embodiments of the present invention. Depicted in FIG. 2 is a merchant 1000 facility with an address or location 1007, the physical location or address of a facility 1007 is an example of a macro location. There are several prior art references that describe macro location determination as used by embodiments of the present invention. In order for a location and product based offer system to operate, a macro location or facility 1007 is first determined and communicated to the offer application 8000. In an embodiment, consumer 6000 uses features of their mobile computing and communication device 2000 to receive signals from GPS satellites 4003, which are subsequently used to determine the consumer 6000's location at facility 1007.

In other embodiments, consumer 6000's location 1007 may be determined from the mobile computing and communication device 2000 through triangulation with RF signals from cell towers 4001 or identification of SSIDs associated with WiFi hotspots 4002 at or near facility 1007, or by merely inputting or selecting, either audibly or tactilely, facility 1007; it's address/location in the mobile computing and communication device 2000.

As depicted in FIG. 2, a merchant 1000 facility 1007 possesses certain physical traits and characteristics including, but not limited to, number of stories or floors, interior dimensions of length 1009 and width 1010 of a floor, numbered aisles or rows 1001, 1002, 1003, common areas 1004, shelving units 1005 for holding products 5000 and cases/racks 1006 for holding products 5000. Additionally, the shelves cases and racks have characteristics such as but not limited to a number of shelves, rows, length, depth and direction of travel. Every product 5000 in a facility 1007 has a precise location 2103.

FIG. 2 depicts the precise location 2103 of product "D" 5004. In an embodiment of the present invention, precise location 2103 of product "D" 5004 is defined similarly to longitude and latitude, such as "facility 1007, floor z, x feet South along dimension 1009, y feet East along dimension 1010." In another embodiment, additional location information is given such as "aisle $^13^1$ 1003, shelf 1005 with ID 1014 and shelf number w." Wherein w, x, y & z are variables associated with the various products 5000. These embodiments, describing a precise location 2103, are not the only methods that can be employed to describe a precise location 2103 of a product 5000 within a facility 1007, therefore, methods outside of what is described herein, that adequately describe a products relative location within the 3-dimensional space of a facility 1007, could be utilized to create precise locations 2103 for a location and product based offer system and are considered potential embodiments of the present invention.

The precise location 2103 of products 5000 depicted in FIG. 2 are communicated over network 3003 to an offer and index management system 3200 which is operatively coupled to system indices 7000, which store, organize and make available the precise location 2103 for specific products 5000 at specific facilities 1007.

As depicted in FIG. 2, one embodiment of the present invention includes additional optional elements deployed throughout a facility 1007 to aid in macro and micro location determination. 1004 is a facility ID tag and includes a barcode that communicates the macro location 1007 of the facility. In another embodiment, a location's unique visual characteristics 1011 are identified at precise locations 2103 throughout the facility 1007. In yet another embodiment a plurality of Bluetooth 4005 tags are distributed at precise locations 2103 throughout facility 1007. A Bluetooth tag 4005 transmits a computer readable RF signals which are received by a mobile computing and communications device 2000 when in the immediate vicinity of the Bluetooth tag 4005. A mobile computing and communications device 2000 is able to read the Bluetooth 4005 tags unique ID through these RF communications.

The precise location 2103 of Bluetooth 4005 tags and/or location's unique visual characteristics 1011 depicted in FIG. 2 are communicated over network 3003 to an offer and index management system 3200 which is operatively coupled to system indices 7000, which store, organize and make available the precise location 2103 for specific Bluetooth 4005 tags and/or location's unique visual characteristics 1011 at specific facilities 1007.

FIG. 2 further depicts an embodiment where a consumer's 6000 precise location is determined by the offer and index management system 3200 while shopping in a facility 1007. A consumer scans 4004 an element that possess a precise location 2103 in the system indexes 7000, by using their mobile computing and communication device 2000 and the operatively coupled offer application 8000. In a preferred embodiment the scanned element is a product 5000 barcode 5012. In other embodiments, the scanned element is a Bluetooth 4005 tag, location's unique visual characteristics 1011 or electronically readable or manually enterable element with a precise location 2103. In embodiments of the present invention, location determination elements are read electronically with consumer's 6000 mobile computing and communication device 2000, but other embodiments allow consumer 6000 to manually enter location identification information into mobile computing and communication device 2000 using any supported data entry method such as audible voice entry, tactical data entry or gesture/motion recognition. Offer application 8000 uses the mobile computing and communication device's 6000 network 3003 connection to communicate the scanned elements unique ID information to the offer and index management system 3200. The offer and index management system 3200 uses the information in the system indexes 7000 to extract the consumer's 6000 location in facility 1007. In an embodiment of the present invention, once a consumer's 6000 precise location 2103 is determined by the offer and index management system 3200, a location based offer for a product 5000 at or near consumer's 6000 precise location 2103 is communicated to the offer application 8000, in this embodiment the consumer 6000 is presented with an advertisement for product "A" 5002 with a sale price of 5015.

The embodiments in FIG. 2 describe embodiments where network 3003 connectivity exists for all of the various communication steps. This active real time location creation, location determination, offer creation, and delivery process is not the only method that can be employed to realize a location and product based offer system, therefore, systems outside of what is described herein, including offline data stores, cached systems, cached information, and cloud systems may be utilized to extract, create, extrapolate and/or communicate all or portions of the location and product based offer system.

FIGS. 3A and 3B provide a block diagram illustrating the operating environment of a location and product based offer system, in accordance with an embodiment of the present invention. FIG. 3A illustrates an embodiment of a centralized mobile advertising and offer system 3, of the present invention. As depicted in the diagrams of FIGS. 3A and 3B, an offer and index management entity 3002 operates one or more offer and index management systems 3200 that are operatively coupled, via network 3003, to one or more computer systems, including offer generation and redemption system 3100, operated by offer generating entity 3001, consumer computer systems 6001 and mobile communication and computing devices 2000, operated by consumer 6000, product location and indexing systems 3300, operated by the offer and index management entity 3002 or its subsidiaries or contractors as well as other systems to manage and administer the system and user accounts, which are not shown.

The operational coupling of aforementioned systems, entities, customers, users, and administrators enable a centralized mobile advertising and offer system 3 where a consumer 6000 at a merchant facility 1007 is able to use mobile computing and communication device 2000 to scan and identify product 5000 and transmit product 5000's unique product identification code to offer and index management systems 3200, which, in turn, identifies consumer 6000's precise location 2103, based in part on the precise location 2103 of product 5000 as provided by the system indices 7000, within facility 1007, as well as products within the proximity of consumer 6000 that have offers available from offer generating entities 3001, based in part on the precise location 2103 of other products 5000 as provided by the system indices 7000 and hierarchical relationship logic 3026.

As illustrated in FIG. 3A, offer index and management systems 3200 operated by offer and index management entity 3002 use hierarchical relationship logic 3026 and offer parameters 3013 for products 5000 to determine applicable offers to communicate to offer application 3000 running within consumer 6000's mobile computing and communications device 2000.

Network 3003 may include any combination of known or unknown wireless or wireline data connection used for communications, as described above, and may provide communication paths between entities, systems, and devices in the centralized mobile advertising and offer system 3. In some embodiments of the present invention, the systems associated with the centralized mobile advertising and offer system 3 may be virtualized or used in a cloud computing network or environment. Therefore, systems outside of those specifically described here may be utilized to run, store, pass data to, or receive data from any part of the centralized mobile advertising and offer system 3 elements or functions described herein. It is foreseeable that some connections with network 3003 may not always be active or available. In this event, elements and systems associated with centralized mobile advertising and offer system 3 may use locally stored data or cached information. When network 3003 becomes available again, the systems and elements will transmit any stored offline data and synchronize their caches and data stores with the centralized mobile advertising and offer system 3.

Communication across network 3003 typically uses standard communication protocols as used by computing systems to communicate on the Internet. Some of these common protocols include Internet Protocol (IP), Transmission Control Protocol (TCP), User Datagram Protocol (UDP), Hypertext Transfer Protocol (HTTP), File Transfer Protocol (FTP), Dynamic Host Configuration Protocol (DHCP), Address Resolution Protocol (ARP), Extensible Markup Language (XML), and Simple Object Access Protocol (SOAP).

FIGS. 3A & 3B illustrate several entities operating computing systems which provide the features or functionality and operation of the centralized mobile advertising and offer 3 system. One such entity, as illustrated in FIG. 3A, is the offer generating entity 3001. Offer generating entity 3001 can be, but is not limited to, a first entity that wants to distribute offers or advertisements for products 5000 they create, manufacture, manage, sell, advertise market and/or distribute. In an embodiment, offer generating entity 3001 includes a product 5000 manufacturer 5010, or a merchant 1000 that sells or distributes and combination of its own and/or a plurality of manufacturer 5010 products 5000.

As further illustrated in FIG. 3A, offer generating entity 3001 operates an offer generation and redemption system 3100 which generally includes a communication device 3103, processing device 3101, input device 3102, memory device 3104, and storage device 3107, which may be part of or a separate element to the memory device 3104. The processing device 3101 is operatively coupled to the communication device 3103, input device 3102 and memory device 3104.

The processing device 3101 uses the input device 3102 to interface with local users enabling communication of instructions, settings and desires to the offer generation and redemption system 3100. An input device 3102 is any peripheral (piece of computer hardware equipment) used to provide data and control signals to an information processing system such as a processing device 3103 or other information appliance. Examples of input devices 3102 include but are not limited to keyboards, mice, scanners, digital cameras, microphones, tablets and joysticks.

The processing device 3101 uses the communication device 3103 to interface with network 3003 and a plurality of systems and interconnected applications interfacing with network 3003, such as, but not limited to, offer and index management system 3200 offer management application 3207, product management application 3209 analysis/analytics application 3213 and/or other systems or applications of the centralized mobile advertising and offer 3 system not shown. As such, the communication device 3103 generally comprises a network interface card (NIC), modem, wireless network adapter, serial bus connection, parallel bus connection, or any other device known and unknown for connecting to network 3003 and communicating with other elements or devices connected to network 3003.

As further illustrated in FIG. 3A, processing device 3101 executes computer executable code 3105 stored in memory device 3104, which in one embodiment contains code for an offer generation application 3108 which is visualized for a user through a user interface 3106, of which code is also stored in memory device 3104. In another embodiment, memory device 3104 holds computer executable code 3105 for an account management application 3109 and in yet another embodiment, memory device 3104 holds code for web browser 3110.

Memory device 3104 may contain or be operatively coupled to storage device 3107. In embodiments of the present invention, storage device 3107 is used by offer generation and redemption system 3100 applications to store information, settings, data, and other storable media required for operation of the system.

As discussed later in greater detail, in one embodiment, the offer generating entity 3001 uses an offer generation application 3108 running on an offer generation and redemption system 3100 and operatively coupled to network 3003 to communicate with an offer and index management system 3200 and create location based offers for products 5000 for the centralized mobile advertising and offer 3 system. In an embodiment, the offers created would be for products 5000 that possess a unique ID 5006 and define offer parameters 3013 and offer details 3012. In another embodiment, offer generating entity 3001 uses a web browser 3110, instead of or in conjunction with locally installed applications, to communicate with an offer and index management system 3200 to create location based offers.

As further illustrated in FIG. 3A, another entity operating computing systems, which provide some features or functionality and operation of the centralized mobile advertising and offer 3 system, is the offer and index management entity 3002. Offer and index management entity 3002 is an entity that manages offers for a plurality of entities, with a first entity that wants to distribute offers or advertisements for products 5000 they create, manufacture, manage, sell, advertise, market, and/or distribute.

In an embodiment of the present invention, offer and index management entity 3002 provides a service including but not limited to the hierarchical relationship logic, databases and indexes that enable a centralized mobile advertising and offer system 3, where a product 5000 manufacturer 5010 or a merchant 1000 creates offers for a plurality of products 5000 that are then served to consumers 6000, based in part on hierarchical relationship logic 3026, offer parameters 3013, precise locations 2103, and/or other factors.

As further illustrated in FIG. 3A, offer index and management entity 3002 operates an offer and index management system 3200 which generally includes a communication device 3203, processing device 3201, input device 3102, memory device 3204, and storage device 3215, which may be part of or a separate element to the memory device 3204. The processing device 3201 is operatively coupled to the communication device 3203, input device 3202, and memory device 3204.

The processing device 3201 uses the input device 3202 to interface with local users enabling communication of instructions, settings and desires to the offer and index management system 3200. An input device 3202 is any peripheral (piece of computer hardware equipment) used to provide data and control signals to an information processing system such as a processing device 3203 or other information appliance. Examples of input devices 3202 include but are not limited to keyboards, mice, scanners, digital cameras, microphones, tablets, and joysticks.

The processing device 3201 uses the communication device 3103 to interface with network 3003 and a plurality of systems and interconnected applications interfacing with network 3003, such as, but not limited to, offer generation and redemption system 3100, offer generation application 3108, product location and index system 3300, consumer computer systems 6001, mobile computing and communication devices 2000, account management application 3109, and/or other systems or applications of the centralized mobile advertising and offer 3 system not shown. As such, the communication device 3203 generally comprises a network interface card (NIC), modem, wireless network adapter, serial bus connection, parallel bus connection, or any other device known and unknown for connecting to network 3003 and communicating with other elements or devices connected to network 3003.

As further illustrated in FIG. 3A, processing device 3201 executes computer executable code 3205 stored in memory device 3204, which in one embodiment contains code for one or more applications such as a management interface 3206, offer management application 3207, offer delivery application 3208, product management application 3209, consumer management application 3210, client management application 3211, location management application 3212, analysis/analytics application 3213, web server 3214, and other applications not shown, of which code is also stored in memory device 3204.

Memory device 3204 may contain or be operatively coupled to storage device 3215. In embodiments of the present invention, storage device 3215 is used by offer index and management system 3200 applications to store information, settings, data, and other storable media required for operation of the system. As further depicted in FIG. 3A, the applications included in the offer index and management systems 3200, in whole or in part, make up the logical processing mechanisms that provide the hierarchical relationship logic 3026, which in turn utilizes information, settings, parameters and or data from the system indices 7000.

FIG. 3A illustrates an embodiment where system indices 7000 generally include multiple databases and indexes, where system indices 7000 are made up of one or more of these elements which, are operatively stored in memory device 3204 and or storage device 3215, including but not limited to product characteristic and identification index/database 3020, product manufacturer database/index 3021, merchant database/index 3022, product location database/index 3023, offer management database/index 3024, and/or consumer database/index 3025.

As discussed later in greater detail, in one embodiment, the offer and index management entity 3002 uses a web server 3204 operatively coupled to an offer management application 3209 running on an offer and index management system 3200 and operatively coupled to network 3003 to communicate with a plurality of offer generating and redemption systems 3100 to receive manage and distribute location based offers for products 5000 for a centralized mobile advertising and offer 3 system. In a preferred embodiment, the offers created for products 5000 possess a unique ID 5006, offer parameters 3013 and offer details 3012 of which information elements are stored in the system indices 7000. In another embodiment, offer and index management entity 3002 subsequently uses a web server 3214, in conjunction with locally installed consumer application 3407 or a web browser 3106, on consumer's 6000 mobile computing and communication device 2000 to communicate location based offers through the offer delivery application 3208.

FIG. 3B is a continuation of the illustrations in FIG. 3A and, in part, generally depicts a product location and indexing system 3300 operated or managed by the offer and index management entity 3002, and provides additional features, functionality and/or operation of the centralized mobile advertising and offer 3 system. Offer and index management entity 3002 may directly operate and manage the product and location and indexing system 3300 or it may communicate with another entity providing the functionality and/or information provided by the product location and indexing system 3300.

In an embodiment of the present invention, product location and index system 3300 reads, identifies measures, receives, calculates and/or determines the unique ID 5006 and precise location 2103 of manufacturer 5010 product 5000 within merchant 1000 facility location 1007. As depicted in FIG. 3B, product location and indexing system 3300 generally uses a combination operatively coupled peripheral input devices, such as digital camera(s), distance measurement devices, scanners, bar code readers, keyboards, mice, and/or other product and location identification elements not shown, to identify products 5000, their unique ID 5006 and their precise locations 2103 in a facility 1007 and communicate such information to an offer and index management system 3200 over an operatively coupled network 3003.

As further illustrated in FIG. 3B, offer index and management entity 3002 operates a product location and indexing system 3300 which generally includes a communication device 3303, processing device 3301, input devices 3302, memory device 3304, and storage device 3312, which may be part of or a separate element to the memory device 3304. The processing device 3301 is operatively coupled to the communication device 3303, input devices 3302 and memory device 3304.

The processing device 3301 is operatively coupled to the input devices 3302 and uses them to interface with users and the local 3-dimensional operating environment and generally enables communication of information elements such as instructions, commands, images, settings, computer readable codes, RF data, and measurements that are used to provide data and control signals to an information processing system such as a processing device 3203 or other peripheral appliance. Examples of input devices 3202 include but are not limited to digital camera/video recording devices 3304, scanner/barcode reader 3305, distance measurement device 3306 or any other peripheral (piece of computer hardware equipment) keyboards, mice, microphones, tablets, and joysticks.

The processing device 3301 uses the communication device 3303 to interface with network 3003 and a plurality of systems and interconnected applications interfacing with network 3003, such as, but not limited to, offer and index management system 3200, location management application 3212, product management application 3209, and/or other systems or applications of the centralized mobile advertising and offer 3 system not shown. As such, the communication device 3303 generally comprises a network interface card (NIC), modem, wireless network adapter, serial bus connection, parallel bus connection, or any other device known and unknown for connecting to network 3003 and communicating with other elements or devices connected to network 3003.

As further illustrated in FIG. 3B, processing device 3301 executes computer executable code 3308 stored in memory device 3307, which in one embodiment contains code for one or more applications such as indexing application 3309, location application 3310, mapping application 3314, web browser 3315, user interface 3311 and other applications not shown, of which code is also stored in memory device 3204.

Memory device 3307 may contain or be operatively coupled to storage device 3312. In embodiments of the present invention, storage device 3312 is used by product location and index system 3300 applications to store information, settings, data, and other storable media required for operation of the system.

As further depicted in FIG. 3B, the product location and index system 3300 may operate with battery/power supply 3313, which enable portable use of the system throughout a facility 1007.

FIG. 3B illustrates an embodiment where product location and indexing system 3300 generally communicates information in near real-time with offer and index management system 3200 where the data is subsequently parsed by the various applications and stored in the system indices 7000. In other embodiments, product location and indexing system 3300 stores the data collected by its input devices 3303 in memory device 3307 and or storage device 3312, which are operatively coupled through the processing device 3301. Stored data and information includes but is not limited to product characteristics and identification information, location data, mapping data, store images, product images shelf images and any other data or information collected by the product location and indexing system 3300. In further embodiments, product location and indexing system 3300 uploads and synchronizes stored data with the offer and index management system 3200 via network 3003 or a direct serial or parallel connection at a later time.

As discussed later in greater detail, in one embodiment, the product location and indexing system 3300 uses a indexing application 3309, location application 3310, mapping application 3314, web browser 3315, and user interface 3311 operatively coupled to network 3003 to communicate with a plurality of applications operating within the offer and index management system 3200 to receive, process, manage and distribute location and product information to the appropriate system indices 7000, where they will later be used to determine and deliver location based offers for products 5000 for a centralized mobile advertising and offer 3 system.

Figure 4:
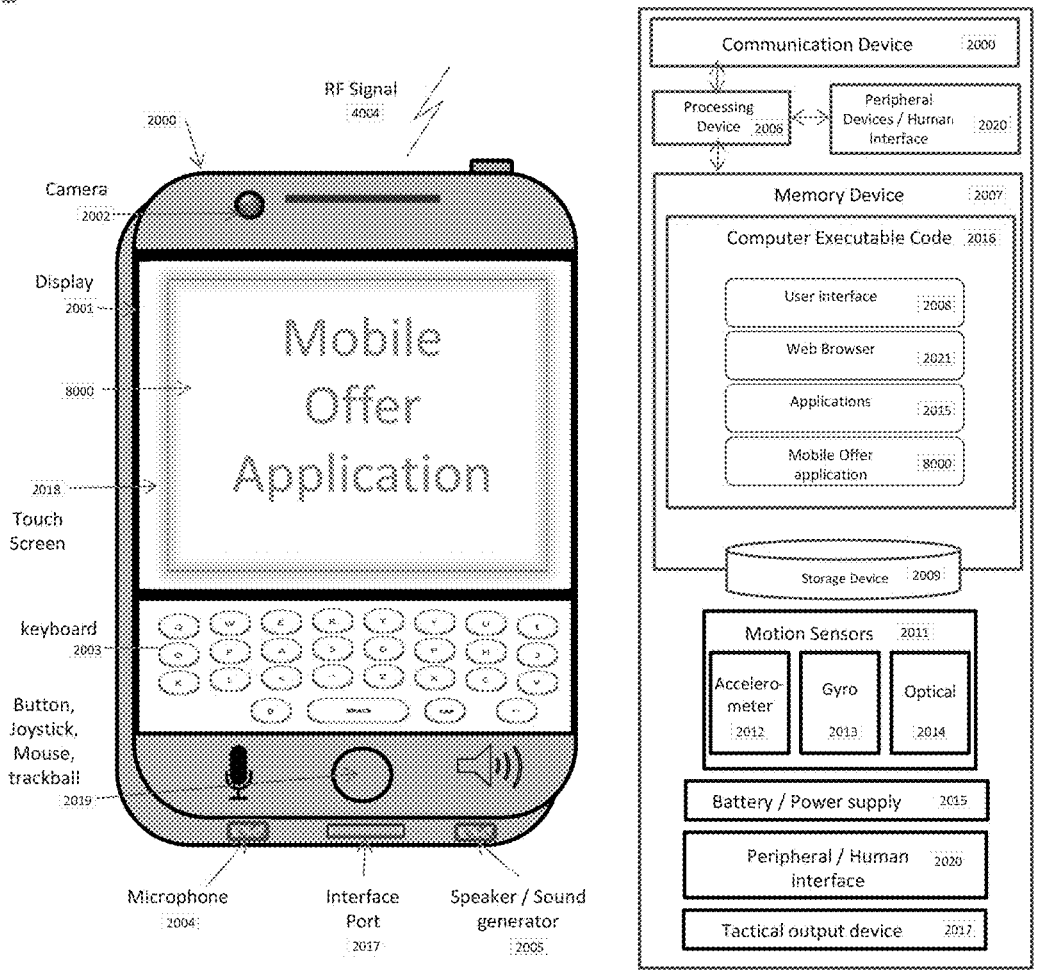
FIG. 4 illustrates a general mobile computing and communication device as used, in accordance with one or more aspects consistent with the innovations herein.

Further illustrated in FIG. 3B are the general consumer computer systems 6001 and mobile computing and communications device 2000, which is described in greater detail in FIG. 4. In an embodiment of the present invention, the consumer computer system 6001 is a personal computing system operated by the consumer 6000 separately from their mobile computing and communication device. In this embodiment, a personal computer (PC) is any general-purpose computer whose size, capabilities, and original sales price make it useful for individuals, and which is intended to be operated directly by an end-user with no intervening computer operator. Software applications for most personal computers include, but are not limited to, word processing, spreadsheets, databases, Web browsers and e-mail clients, digital media playback, games, and myriad personal productivity and special-purpose software applications. Modern personal computers often have connections to the Internet, allowing access to the World Wide Web (Internet) and a wide range of other resources. Personal computers may be connected to a local area network (LAN), either by a cable or a wireless connection. A personal computer may be a desktop computer or a laptop, notebook, tablet, netbook, handheld PC or other equivalent system know or unknown.

As further illustrated in FIG. 3B, consumer computer system 6001 generally includes a communication device 3403, processing device 3401, input devices 3402, memory device 3404 and storage device 3108, which may be part of or a separate element to the memory device 3404. The processing device 3401 is operatively coupled to the communication device 3403, input devices 3402 and memory device 3404.

The processing device 3101 uses the input device 3102 to interface with local users enabling communication of instructions, settings and desires to the offer generation and redemption system 3100. An input device 3102 is any peripheral (piece of computer hardware equipment) used to provide data and control signals to an information processing system such as a processing device 3103 or other information appliance. Examples of input devices 3102 include but are not limited to keyboards, mice, scanners, digital cameras, microphones, tablets, and joysticks.

The processing device 3401 uses the communication device 3403 to interface with network 3003 and a plurality of systems and interconnected applications interfacing with network 3003, such as, but not limited to, offer and index management system 3200, offer delivery application 3208, consumer management application 3210, and/or other systems or applications of the centralized mobile advertising and offer 3 system not shown. As such, the communication device 3403 generally comprises a network interface card (NIC), modem, wireless network adapter, serial bus connection, parallel bus connection, or any other device known and unknown for connecting to network 3003 and communicating with other elements or devices connected to network 3003.

As further illustrated in FIG. 3B, processing device 3401 executes computer executable code 3405 stored in memory device 3404, which in one embodiment contains code for a consumer offer application 3407, which is visualized for a user through a user interface, of which code is also stored in memory device 3404. In another embodiment, memory device 3404 holds computer executable code 3105 for a web browser 3416.

Memory device 3404 may contain or be operatively coupled to storage device 3408. In embodiments of the present invention, storage device 3407 is used by consumer computer system 6001 applications to store information, settings, data, and other storable media required for operation of the system. In other embodiments storage device 3408 contains an offline database/index 3409, which allows mobile offer application 8000 to operate with cached data from the system indices 7000 in the event network 3003 isn't available for real-time transactions or communications.

As discussed later in greater detail, in one embodiment, the consumer 6000 operates a web browser 3406 on their consumer computer system 6001 to interface with an offer and index management system 3200. Consumer 6000 interfaces with client management application 3211 and configures preferences and settings for their account such as shopping lists, favorite products, product preferences, watch lists, privacy settings, personal settings, loyalty program information, advertising preferences, favorite facility locations 1007 and/or other information relevant to the use and administration of their account and settings/preferences.

FIG. 3B illustrates a general embodiment of the operational environment of the centralized mobile advertising and offer 3 system. As depicted, products 5000 reside in a facility 1007 where their unique ID 5006 and precise location 2103 are determined by a product location and index system 3300 and communicated via network 3003 to an offer and index management system 3200. A consumer 6000 at facility 1007 uses their mobile computing and communication device 2000 to identify a product 5000, unique ID 5006 and/or location unique visual characteristics 1011 with a mobile offer application 8000, which is then communicated via network 3003 to an offer and index management system 3200. If network 3003 isn't available, mobile offer application 8000 uses an offline database/index 3409, which allows mobile offer application 8000 to operate with cached data from the system indices 7000 until network 3003 becomes available. Mobile offer application delivers offers to consumer 6000 based on the precise location 2103 of consumer 6000 as determined by precise location 2103 of the scanned identification tag from the system indices 7000.

FIG. 4 illustrates a general mobile computing and communication device 2000 used in accordance with embodiments of the present invention. As further illustrated in FIG. 4, mobile computing and communication device 2000 generally includes a communication device 2010, peripheral/human interface devices 2020, sensors 2011, tactical output devices 2017, memory device 2007 and storage device 2009, which may be part of or a separate element to the memory device 2007, of which are all operatively coupled to a processing device 2006.

The processing device 3301 is operatively coupled to the peripheral/human input devices 3302, depicted in FIG. 4, which may include but are not limited to, digital camera 2002, display 2001, keyboard 2003, touchscreen 2018, microphone 2004, speaker/sound generator 2005, and/or button/joystick/mouse/trackball 2019 and, in one embodiment, uses them to interface with consumer 6000 and generally enables communication of information elements such as instructions, commands, images, settings and the local 3-dimensional operating environment, computer readable codes, RF data, measurements and provide data and control signals.

The processing device 2006 uses the communication device 2010 to interface with network 3003 and a plurality of systems and interconnected applications interfacing with the network 3003 and centralized mobile advertising and offer 3 system, such as, but not limited to, offer and index management system 3200, offer delivery application 3208, product management application 3209, and/or other systems or applications of the centralized mobile advertising and offer 3 system not shown. As such, the communication device 3303 generally comprises a network interface adapter (NIC), modem, wireless network adapter, serial bus connection, parallel bus connection, or any other device known and unknown for connecting to network 3003 using either RF signals 4004 or electrical signals and communicating with other elements or devices connected to network 3003.

As further illustrated in FIG. 4, processing device 2006 executes computer executable code 2016 stored in memory device 2007, which in one embodiment contains code for one or more applications 2015 such as mobile offer application 8000, web browser 2021, user interface 2008 and other applications not shown, of which code is also stored in memory device 2007.

Memory device 2007 may contain or be operatively coupled to storage device 2009. In embodiments of the present invention, storage device 2009 is used by mobile offer application 8000 to store information, settings, data, and other storable media required for operation of the system.

As depicted in FIG. 4, the mobile computing and communication device 2000, in one embodiment, contains sensors 2011, which are operatively coupled to processing device 2006. Sensors 2011 are used by the mobile computing and communication device to track and measure movements of the device. Examples of sensors 2011 include, but are not limited to, accelerometer 2012, gyroscope 2013 and optical sensors 2014, which in one embodiment, are used in whole or in part to monitor, track or measure the mobile computing and communication device's 2000 movement throughout a facility 1007.

As further depicted in FIG. 4, the mobile computing and communication device 2000 may operate with battery/power supply 2015, which enable portable use of the device throughout a facility 1007. And, in another embodiment, utilize tactile output devices 2017, which provide physical feedback to consumer 6000 so information can be communicated without the consumer 6000 having to visually look at the display 2001 or listen to the speaker/sound generator 2005 of the mobile computing and communication device 2000.

FIG. 5 illustrates characteristics of a product 5000 as produced by a manufacturer 5010 and offered for sale to a consumer 6000 by a merchant 1000 at a facility 1007 for a price 5015. When a manufacturer 5010 manufactures a product 5000, specific characteristics unique to that product 5000 are included on product 5000's packaging 5011. Every product 5000 is given a unique product code 5006 which is typically displayed on the packaging 5011 in the form of a Universal Product Code (UPC) which is typically a barcode 5001 that may be optically read by a computing device with scanner. Additionally, manufacturer 5010 may affix a Radio-frequency identification (RFID) tag 5013 to the packaging 5011. This allows a product 5000 to be identified electronically without optical or visual scanning by a computing device. As further depicted in FIG. 5, a product 5000 has additional characteristics and features that were not intentionally placed on packaging 5011 for product identification by computing devices, but can be used by computing devices with optical capabilities to visually identify product 5000. These include the shape and size of product 5000's packaging 5011, names and descriptions 5007 as well as pictures and graphics 5008 printed on product 5000's packaging 5011.

As further illustrated in FIG. 5, product 5000 is transferred from the manufacturer's 5010 production facility to a merchant facility 1000 for sale to a consumer 6000. When product 5000 is offered for sale at a merchant facility 1000, it takes on additional intrinsic characteristics that can be used to determine the location of a consumer 6000. These characteristics include the merchant 1000, merchants facilities physical location such as its physical address or longitude and latitude 1007 and the precise location(s) 2103 of the product 5000 within the facility.

Figure 6A:
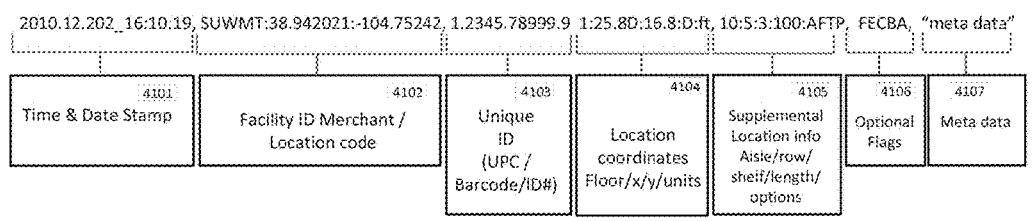
FIG. 6A provides the format of a location ID message describing/defining a precise location for an element/product/tag in a facility, in accordance with one or more aspects consistent with the innovations herein.

The product index system 7000, described throughout this patent, relies on the identification and location of products 5000 within a merchant 1000. FIG. 6A depicts how products 5001, 5002 and 5005 are contextually classified within merchant facility 1007. Products in a facility follow a hierarchical structure similar to that of a library. FIG. 6A shows a shelving unit 1005 within facility 1007. Shelving unit 1005 is associated with a particular aisle 1002 in facility 1007 and has specific characteristics such as the number of shelves 1008 and length 1009 of the aisle. Every shelving unit is given a unique identification code 1014. As products 5000 are indexed their precise location 2103 is identified within the facilities 1007 hierarchy. For instance, product A 5001 is indexed in facility 1007 with metadata that includes aisle 1002 (2), shelving unit 1005, unique ID 1014, shelf 1008 (3), distance 1012 (5') and direction of aisle travel.

FIG. 6A provides the format of a location ID message describing a precise location for an element in a facility, in accordance with an embodiment of the present invention. As illustrated in FIG. 4 a location ID message 4000 is a delimited communication message including multiple information elements that describe a precise location 2103. A preferred embodiment of a location ID message 4000 includes one or more of the following information elements: time and date stamp 4101, facility ID 4102 (merchant and location code), unique ID 4103 (UPC Code, barcode or ID number), location coordinates 4104 (floor/x distance/direction/y distance/direction/units), supplemental location info 4105 (aisle/row/shelf/length/options), optional flags 4106 and/or metadata 4107.

Figure 6B:
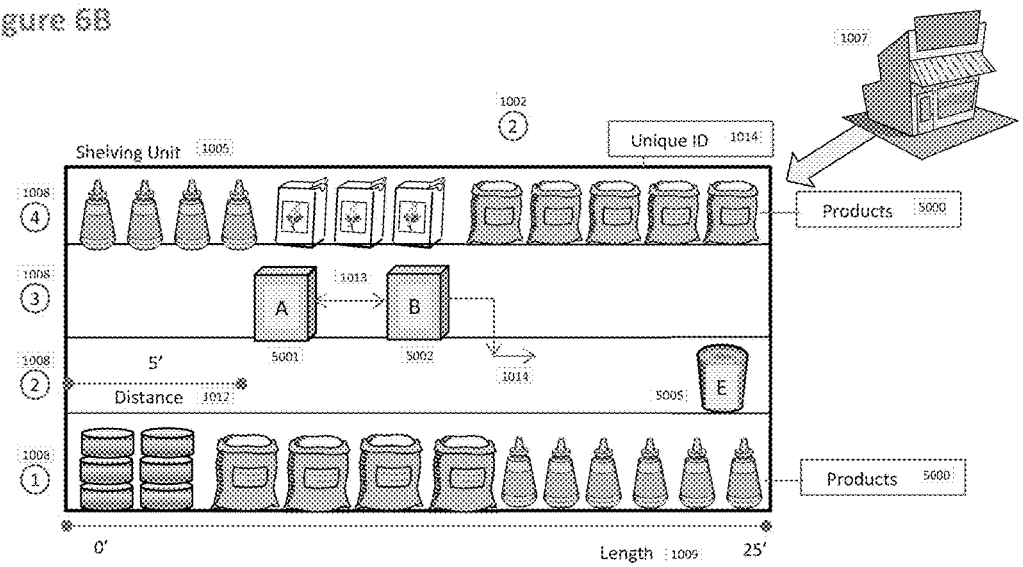
FIG. 6B further illustrates how of precise locations are determined and related to each other, in accordance with one or more aspects consistent with the innovations herein.

FIG. 6B illustrates how precise locations 2103 are determined and related to each other, in accordance with an embodiment of the present invention. As depicted in FIG. 6B, every product 5000 is indexed within a facilities 1007 contextual product hierarchy. Offer index and management system 3200 is able to determine the proximity of products 5000 to each other and consumer 6000. Every product 5000 possesses a precise location 2103. In a preferred embodiment of the present invention a precise location 2103 includes location coordinates 4104 and supplemental location information 4105. By utilizing location coordinates 4104 and supplemental location information 4105, distances between products 1013, differences between shelves 1012 differences between aisle and rows can be calculated or determined by the offer index and management system 3200. Using the information in the system indexes 7000 and hierarchical relationship logic 3026, the offer index and management system 3200 is able to determine the proximity of products with relevant offers within proximity of the consumer 6000 and subsequently to deliver targeted offers or advertisements to the offer application 8000 and direct consumers 6000 to desired products 5000 associated with the delivered offers or advertisements.

Figure 6C:
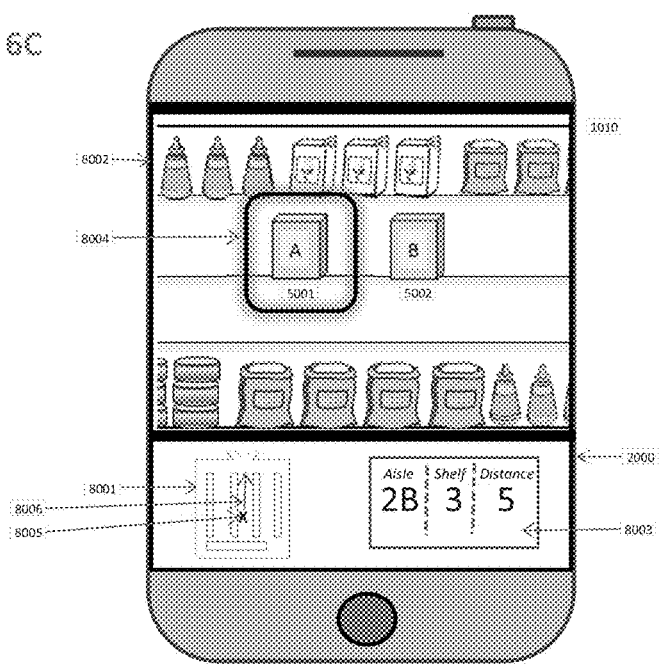
FIG. 6C illustrates how product precise locations are communicated to a consumer using a mobile offer application running on a mobile communication and computing device, in accordance with one or more aspects consistent with the innovations herein.

FIG. 6C illustrates how product 5000 precise locations 2103 are communicated to a consumer using a mobile offer application 8000 running on a mobile communication and computing device 2000, in accordance with an embodiment of the present invention. Depicted in FIG. 6C is mobile offer application 8000 displaying a shelf view 8002 of a product "A" 5001 precise location 2103. In one embodiment, shelf view 8002 shows a digital image of the actual shelving unit 1005 with unique ID 1014 that was captured by a product location and index system 3300 when product "A" 5001 precise location 2103 was determined. In another embodiment, a digital image of the actual shelving may not be available; in this case shelf view 8002 uses a graphical representation of product "A" 5001 precise location 2103. In yet another embodiment, product "A" 5001, or the location of product "A" 5001, is visually highlighted 8004 so it can be easily distinguished from the other products, such as product "B" 5002, displayed in the same view/image.

Further depicted in FIG. 6C is a location map 8001 showing consumer's 6000 current precise location 2103 within a facility 1007 or portion thereof. In one embodiment, the location map 8001 visually shows the consumers current location 8005 in the location map 8001. In another embodiment, the location map 8001 includes a visual indication 8006 directing the consumer 6000 from their current location 8005 to the precise location 2103 of a product "A" 5001. In yet another embodiment, mobile offer application 8000 additionally displays a textual representation 8003 of the precise location 2103 of product "A" 5001 on the display 2001. For example, a textual representation 8003 of the precise location 2103 of a product "A" 5001 would include a row/aisle indicator, shelf location and distance or section indication.

FIG. 7A provides a block diagram illustrating the relationship between a consumer's 6000 current location 2102, precise location 2103, and movement with offer selection, delivery, notification and acceptance; referred to as a consumer location and offer delivery process 7100.

As depicted in FIG. 7A, a consumer location and offer delivery process 7100 begins with block 7101, where the precise location 2103 of consumer 6000 is determined. In one embodiment, a consumer's 6000 precise location 2103 is determined by scanning scan a product 5000 barcode 5012 and communicating product's 5000 unique ID 5006 to an offer and index management system 3200, which in turn communicates data with product indices 7000 to determine the consumer's 6000 current precise location 2103, which is then communicated to consumer's 6000 mobile computing and communication device 2000 and mobile offer application 8000.

As illustrated in block 7102 of FIG. 7A, a consumer moves from their previously known precise location 2103. Once a consumer 6000 moves, their precise location 2103 is no longer known and becomes an estimated location known as their current location 2102, which is updated through alternate methods in order to deliver targeted location based offers. Block 7103 in FIG. 7A depicts using the motion detecting and measuring sensors 2011 of a consumer's 6000 mobile computing and communication device 2000 to estimate their movements and update their current location 2102 within a facility 1007. In a preferred embodiment, a consumer's 6000 precise location 2103 is utilized in conjunction with hierarchical relationship logic 3026, as depicted in block 7104 of FIG. 7A to determine location based offers, which in one embodiment, are determined in real-time by an offer and index management system 3200 and delivered via network 3003 to a mobile offer application 8000.

In another embodiment, a consumer's 6000 current location 2102 is utilized to determine location based offers, which are determined by a mobile offer application 8000 communicating with an operatively coupled storage device 2009, which contain cached offers and offer parameters, as well as 'trigger' locations and conditions, as depicted in block 7105 of FIG. 7A, that define when and where an offer should be communicated to a consumer's 6000 mobile offer application 8000.

Block 7107 of FIG. 7A depicts a tactical or audible notification being used to notify a consumer 6000 that an offer has been communicated. For example, in one embodiment, a mobile offer application 8000 utilizes the mobile computing and communication device's 2000 tactical output device 2017 to produce a vibration on the mobile computing and communication device 2000, which can be felt by the consumer 6000. In another embodiment, a mobile offer application 8000 utilizes the mobile computing and communication device's 2000 speaker/sound generator 2005 to produce an audible tone on the mobile computing and communication device 2000, which can be heard by the consumer 6000.

As further illustrated in block 7108 of FIG. 7A, after receiving a notification communication an offer in the mobile offer application 8000, consumer 6000 may choose to interface with the mobile offer application 8000. If consumer 6000 views mobile offer application 8000, the offer is displayed as depicted in block 7109 and described in FIG. 8B. As further depicted in FIG. 7A block 706, in an embodiment, if a consumer isn't accepting or viewing an offer or scanning a product 5000, they are moving through facility 1007, as depicted in block 7106 and their current location 2102 is being updated, as depicted in block 7103 of FIG. 7A.

As illustrated in block 7110 of FIG. 7A, in one embodiment, if a consumer 6000 accepts an offer; their current location 2102 is updated with a new precise location 2103, as depicted in block 7101 where process then 7100 continues. As further illustrated in block 7112 of FIG. 7A, in one embodiment, at any time after moving from a precise location 2103, a consumer 6000 may scan a product 5000 and/or location's unique visual characteristics 1011, after which their current location 2102 is updated with a new precise location 2103, as depicted in block 7101 where process 7100 then continues.

FIG. 7B provides a block diagram 7200 illustrating the calculation and maintenance of a current location 2102, beginning from a known precise location 2103, through incorporation of movement data provided an inertial navigation system. As illustrated in block 7201 of FIG. 7A, in one embodiment, a consumer's 6000 precise location 2103 is determined through the use of an offer and index management system 3200 and system indices 7000, as described in various figures herein.

Once a consumer 6000 moves, their precise location 2103 is no longer known and becomes an estimated location known as a current location 2102, which is updated in real-time through methods other than those incorporating the location data in the system indices 7000. Block 7202 in FIG. 7B depicts using the motion detecting and measuring sensors 2011 of a consumer's 6000 mobile computing and communication device 2000 to detect and estimate consumer 6000 movements through the use of an inertial navigation system (INS) and data, as illustrated in block 7206 of FIG. 7B.

As depicted in block 7230 the INS calculates orientation, direction and acceleration of the mobile computing and communication device 2000. For example, in one embodiment, motion sensors 2011, which include accelerometer 2012, 3-dimensional gyroscope 2013 and compass, of a mobile computing and communication device 2000, communicate orientation, direction and acceleration of the mobile computing and communication device 2000 to a mobile offer application 8000, operating inertial navigation algorithms, through an operatively coupled processing device 2006 and memory device 2007. The orientation, direction and acceleration data is further used to continuously update a consumer's 6000 current location 2102 within a facility 1007 while motion/movement is detected, as illustrated in block 7205 of FIG. 7B.

As illustrated in FIG. 7B, the processes described in blocks 7203, 7205 and 7206 are continuously executed to update consumer's 6000 precise location 2103 until a product 5000 or location's unique visual characteristics 1011 are identified, as illustrated in block 7204, at which time, a new precise location 2103 is determined and process flow 7200 continues from block 7201 with an updated precise location 2103, as described in the figures herein.

FIG. 7C provides a block diagram 7300 illustrating the calculation and determination of a consumer's interest in a product location 2103 through incorporation of movement data provided an inertial navigation system or digital imaging system. As illustrated in block 7301 of FIG. 7C, in one embodiment, a consumer's 6000 precise location 2103 is determined through the use of an offer and index management system 3200 and system indices 7000, as described in various figures herein.

As a consumer 6000 moves, their movements may indicate interest in products 5000 near a precise location 2103 or current location 2102. Block 7202 in FIG. 7C depicts using the motion detecting and measuring sensors 2011 of a consumer's 6000 mobile computing and communication device 2000 to detect and estimate consumer 6000 movements through the use of an inertial navigation system (INS) and data, as illustrated in block 7206 of FIG. 7B.

As depicted in block 7230 the INS calculates orientation, direction, and acceleration of the mobile computing and communication device 2000. For example, in one embodiment, motion sensors 2011, which include accelerometer 2012, 3-dimensional gyroscope 2013 and compass, of a mobile computing and communication device 2000, communicate orientation, direction and acceleration of the mobile computing and communication device 2000 to a mobile offer application 8000, operating inertial navigation algorithms, through an operatively coupled processing device 2006 and memory device 2007. The orientation, direction and acceleration data is further used to continuously update a consumer's 6000 current location 2102 and detect motion/movement that indicate interest in a product location at the consumer current location 2102, as illustrated in block 7303 of FIG. 7C.

As further depicted in block 7306, the digital imaging camera 2002 of the mobile computing and communication device 2000 is used to capture product 5000 characteristics 5014 such as barcode 5012 ID 5006, name 5007, or image 5008. Barcode 5012 may also be captured from the shelving unit 1005.

As illustrated in FIG. 7C, the processes described in blocks 7301, 7302, 7303, 7304, 7304 and 7206 are continuously executed to update consumer's 6000 precise location 2103 until a product 5000 location is identified as being associated with a location based offer 8200, as illustrated in block 7201, at which time, the offer is presented to the consumer 6000 for their precise location 2103, as illustrated in block 7109. The process flow 7300 continues from block 7301 with an updated precise location 2103, as described in the figures herein.

FIG. 7D provides an illustration 7500 depicting movements that indicate interest in a product 5000 near the consumer's current location 2102. Consumer 6000 is moving down an aisle 1005 or 1006 and a determined velocity 7502. The mobile communication and computing device 2000 continuously measures the movements of the consumer through its INS and motion detection functions. The consumer 6000 indicates interest in products near their current location 2102 by rotating toward a product 5000 as depicted by path 7501, slowing their current velocity 7502 by a determined amount to a slower velocity 7503, stopping their velocity and/or reversing as depicted in path 7504 for a determined distance, or moving toward product 5000 as depicted in path 7506. Product 5001 outside a determined distance to location 2102 may be determined of interest if the hierarchical relationship logic determines it is related to location 2102 and the consumer 6000 follows path 7505.

FIG. 7E provides an illustration 7600 depicting imagery captured on a mobile computing and communication device 2000 that indicates interest in a product 5000 near the consumer's current location 2102. As illustrated in FIG. 7E, consumer 6000 directs the digital camera 2002 of their mobile computing and communication device 2000 toward a product 5000. The digital camera 2002 may be part of a wearable computer 7401 or their mobile phone. The consumer 6000 current location 2102 and captured product information 7402 is used to determine the consumer's 6000 interest in product 5000 and update their precise location 2103.

FIG. 8A provides a block diagram illustrating a bid and offer parameter process for location based offers in accordance with an embodiment of the present invention. As illustrated in FIG. 8A, offer generating entities create offer(s) 8001, which are communicated to an offer index and management system 3200. In one embodiment, offers 8101 consist of a plurality information elements including, but not limited to product 5000 unique ID 5006, bid parameters 8102, offer parameters 8103, offer details 8104 and performance based advertising parameters 8105.

As further illustrated in FIG. 8A, offer parameters include one or more of, but are not limited to, the following; target demographics 8106; offer conditions 8107, such as location parameters, cross-ruff conditions; and/or offer logic 8108. In one embodiment, target demographics 8106 may include, but are not limited to specific consumer 6000 traits such as sex, age, income class, ethnicity, and/or other demographic metrics. In another embodiment, offer conditions 8107 may include, but are not limited to, purchasing factors such as product preferences, competitive products purchased, consumer's 6000 relationship with the offer generating entity 3001, and/or other offer limiting or determining conditions. In another embodiment, offer details 8104 may include, but are not limited to; offer value 8109, which is the monetary value of the offer; offer ID 8110, which is a unique ID that identifies the offer; barcode 5012; terms and conditions 8112; offer type 8114, such as coupon, advertisement, recipe, etc; and/or an expiration date 8113. In yet another embodiment, performance based advertising parameters 8105 include but are not limited to an offers monetary factors as they relate to performance based advertising factors such as CPM, CPC, CPL, CPA, and competitive conversion. A competitive conversion is where a consumer 6000 was going to purchase an alternative product, but after receiving the offer decided to purchase the offer product in addition to or instead of the competitive product. For instance, an offer generating entity 3001, may determine that they will pay up to $1.25 CPM for up to $100 a day and $0.25 CPA up to $500 per day and $0.55 per competitive conversion without a daily limit.

As depicted in FIG. 8A, offers 8101 created by the offer generating entity 3001 are communicated to an offer and index management system 3200, where they are logically classified by the hierarchical relationship logic 3026 and stored in the system indices 7000.

As further illustrated in FIG. 8A, consumer 6000 uses a mobile computing and communication device 2000 operating a mobile offer application 8000 to communicate unique IDs 5006 to an offer and index management system 3200, which is used to determine the consumer's precise location 2103. In another embodiment the mobile computing and communication device 2000 operating a mobile offer application 8000 uses an INS to measure movement and calculate a current location 2102, which is used to determine offers.

As further depicted in FIG. 8A, location based offers 8201 and or location based advertisements 8202 are communicated to the mobile offer application 8000 by the offer and index management system 3200. In another embodiment, the mobile offer application 8000 generates offers based on a cache of the offer index and management systems data/logic contained in its storage device 2009. Further illustrated in FIG. 8A, is a further embodiment where results 8115 are communicated to the offer generating entity 3001; who then pays performance based advertising fees 8116 to the offer generating entity 3001.

FIG. 8B illustrates the presentation of a location based offer 8200, in accordance with an embodiment of the present invention. As depicted in FIG. 8B, a location based offer 8200 is presented on the display 2001 of the consumer's 6000 mobile computing and communication device 2000. A location based offer 8200 consists of multiple interaction options for the consumer 6000. As depicted in FIG. 8B these include the ability to "Accept" 8203 or "Reject" 8204 the location based offer 8200 with the offer details 8201. As further depicted in FIG. 8B, one embodiment allows the consumer 6000 to locate the product 5000 in the offer 8201, which in one embodiment would result in an output as depicted in FIG. 6C.

FIG. 8B further illustrates one embodiment, where a location based advertisement 8202 is presented through the offer application 8000, which may or may not be related to product 5000 in offer 8200, in a separate banner advertisement space on the display 2001.

Figure 8C:
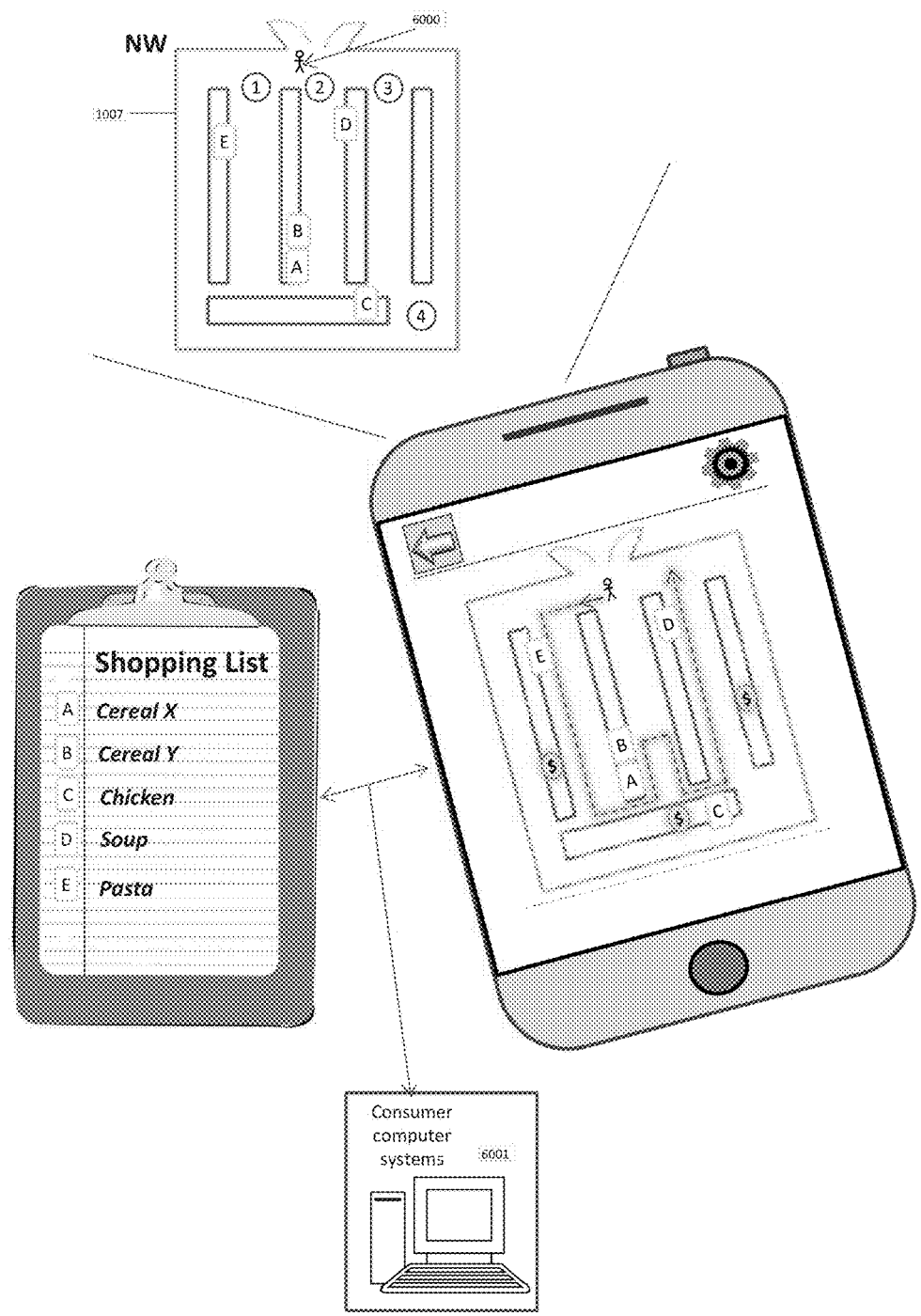
FIG. 8C illustrates embodiments associated with a shopper's grocery list being processed and mapped on a GUI, in accordance with one or more aspects consistent with the innovations herein.

FIG. 8C illustrates an embodiment where a shopper's grocery list is loaded into the mobile computing device, such as via a consumer computer 6001. Then, at the store by means of the innovations herein, the shopper will be provided with a map of the store showing the locations of the items on the grocery list, and may even be provided with a rote map illustrating a recommended route through the store to obtain the items most expeditiously.

Figure 9A:
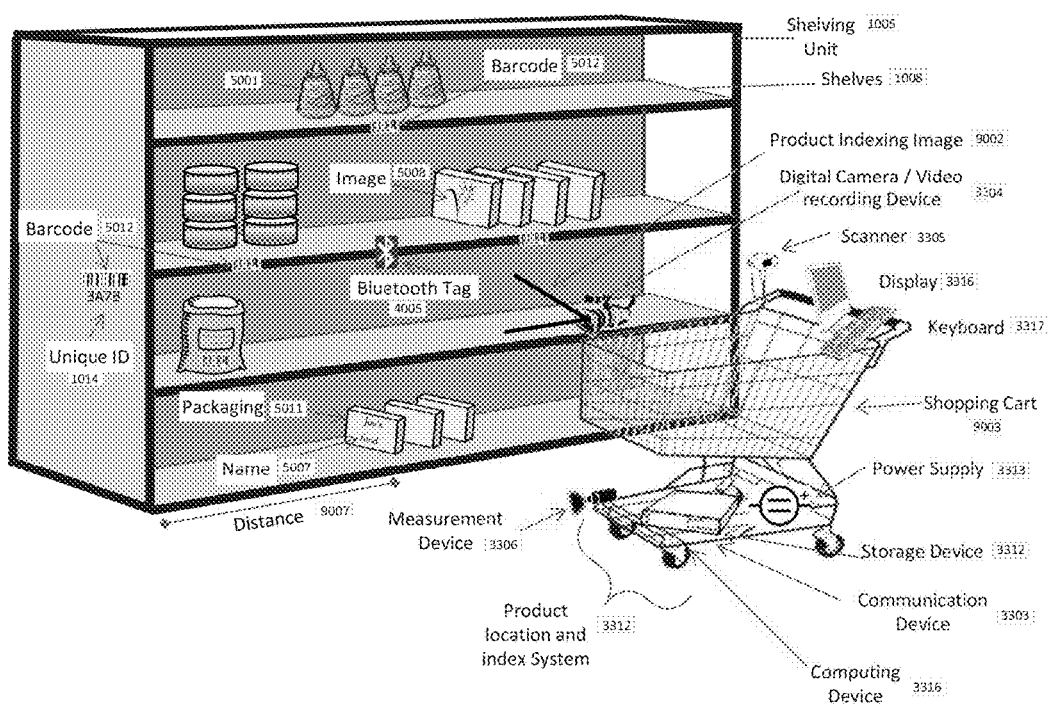
FIG. 9A illustrates the use of a product location and index system to "index" a facility, in accordance with one or more aspects consistent with the innovations herein.

FIG. 9A illustrates the use of a product location and index system 3312 to "index" a facility 1007, in accordance with an embodiment of the present invention. One embodiment of the present invention is depicted in FIG. 9A and consists of a shelving unit 1005 with a unique ID 1014 residing within a merchant 1000 facility 1007. In this embodiment, one indexing step is to identify products 5000 and their precise locations 2103 within the macro location 1007. As depicted in FIG. 9A, various products 5000 reside on different shelves 1008 and at different precise locations 2103, which in one embodiment consist of different distances 9001 from a known point on the shelving unit 1005.

As further depicted in FIG. 9A, the indexing process is conducted by a product location and indexing system 3312. In one embodiment of the present invention, the product location and indexing system 3312 includes a shopping cart 9003 housing a computing device 3316, digital camera/video recording device 3304, measurement device 3306, barcode scanner 3305, communication device 3303, power supply/battery 3313, display 3316, and keyboard 3317. As illustrated in FIG. 9A, the various products 5000 possess uniquely identifiable features. In one embodiment, these uniquely identifiable features are captured by the digital camera/video recording device 3304 in the form of a product indexing image 9002.

FIG. 9B illustrates a representation of a product indexing image 9002 in accordance with an embodiment of the present invention. As depicted in FIGS. 9A and 9B, the various products 5000 possess uniquely identifiable features such as the shape 9008 and size 9005 of their packaging 5011, images 5008 and/or writing such as the products name 5007 and barcodes 5012 on their packaging 5011 and/or the shelves 1008. In another embodiment, the various distances 9007 of the products 5000 from a known starting point on a shelving unit are used, in part, to determine the product 5000 precise location 2103, with 9003 possessing a distance of 9001 and 9004 a distance 9006 as depicted in FIG. 9B. As further depicted in FIGS. 9A and 9B, the measurement device 3306 and/or Bluetooth tags 4005 are used to measure or determine the distance 9007 of each product indexing image 9002 and subsequently captured products 5000.

Also depicted in FIG. 9B is a block diagram outlining product 5000 identification and precise location 2103 determination. The product location and index system 3312 uses edge and characteristic logic 9009 to identify unique product characteristics that are then looked up in a product recognition database 9010. In another embodiment, if a product 5000 isn't recognized in the product recognition database 9010, the scanner 3305 can be used to identify the product 5000 by reading the unique ID 5006 contained in its barcode 5012. In yet another embodiment, once a product 5000 has been identified, environmental logic 9011 taking in to account environmental factors such as, but not limited to, the products distance 9007, shelf 1008, presence of Bluetooth tags 4005, unique visual characteristics 1011 of the area and/or relationship data are used to create the precise location 2103 index information.

FIG. 9C is a flow diagram further describing illustrative product 5000 indexing processing, in accordance with one or more aspects consistent with the innovations herein. According to the illustrative processing set forth in FIG. 9C, an exemplary method for performing indexing processing may comprise: collecting, e.g. via the product location and index system, a product indexing image at a distance "x" along a shelving unit 9100; storing the image in the product location and index systems storage device 9101; utilization, via the product location and indexing system, of environmental logic to track location and global characteristics of product indexing image 9102; using, via the product location and indexing system, edge and characteristic logic to determine product edges 9103; using, via the product location and indexing system, edge and characteristic logic to extract key product identification features 9104; using the product identification features to locate product in product recognition database 9105; utilizing environmental logic to identify a product's precise location 9106; storing the precise location and product identification information in the mobile computing and communication devices storage device 9107; and, finally, communicating the precise location, product identification and indexing data to the offer and index management system 9108.

Figure 10A:
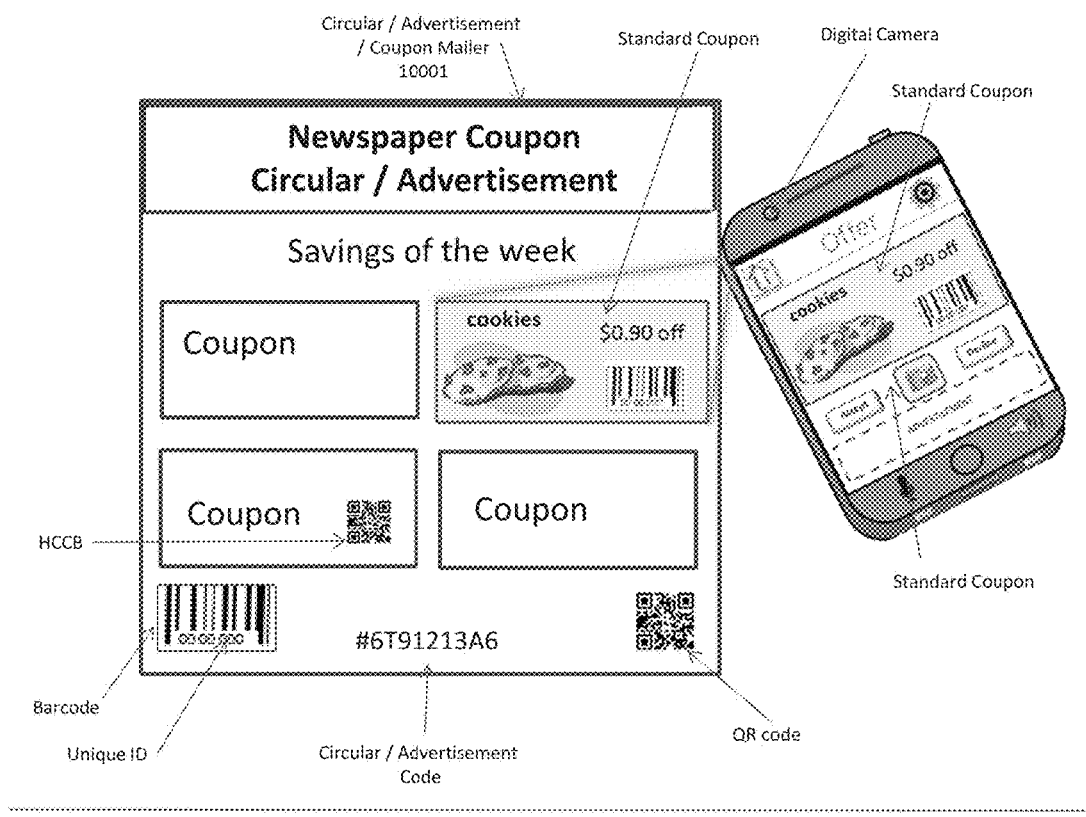
FIG. 10A is a diagram illustrating exemplary scanning or obtaining of coupons and/or advertising, in accordance with one or more aspects consistent with the innovations herein.

FIG. 10A is a diagram illustrating exemplary scanning or obtaining of coupons and/or advertising, in accordance with one or more aspects consistent with the innovations herein. Referring to FIG. 10A, an illustrative circular, advertisement or coupon mailer 10001 is shown containing one or more of a variety of coupon or advertising mechanisms, such as standard coupons, barcodes, HCCB codes, QR codes, circular/advertisement codes, and/or other unique IDs or numbers. Further, FIG. 10A illustrates the user device with a digital camera to scan or capture the coupon indicia. Once the information is scanned/captured, FIG. 10A shows the innovations herein providing various GUI functionality on the user device, including an image of the coupon, the ability to accept or decline the coupon and/or related offers, as well as additional advertisement(s) that may be targeted to the user and populated on the device via the back end processing component(s).

Figure 10B:
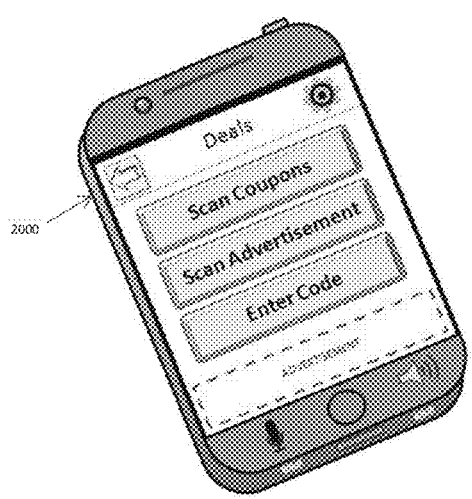
FIG. 10B is a diagram further illustrating exemplary GUI aspects of scanning or obtaining of coupons and/or advertising, in accordance with one or more aspects consistent with the innovations herein.

FIG. 10B is a diagram further illustrating exemplary GUI aspects of scanning or obtaining of coupons and/or advertising, in accordance with one or more aspects consistent with the innovations herein. Referring to FIG. 10B, various exemplary functionality as may be presented on the user device is shown. Here, for example, a selection screen depicting various options a user may have to scan or obtain coupons or deals are shown, including a scan coupons function, a scan advertisement function, and an enter code function. This functionality may be presented as part of various 'deals' or options available to the user, and may be presented with various advertisements related to the products, location or other demographic information known.

Figure 11:
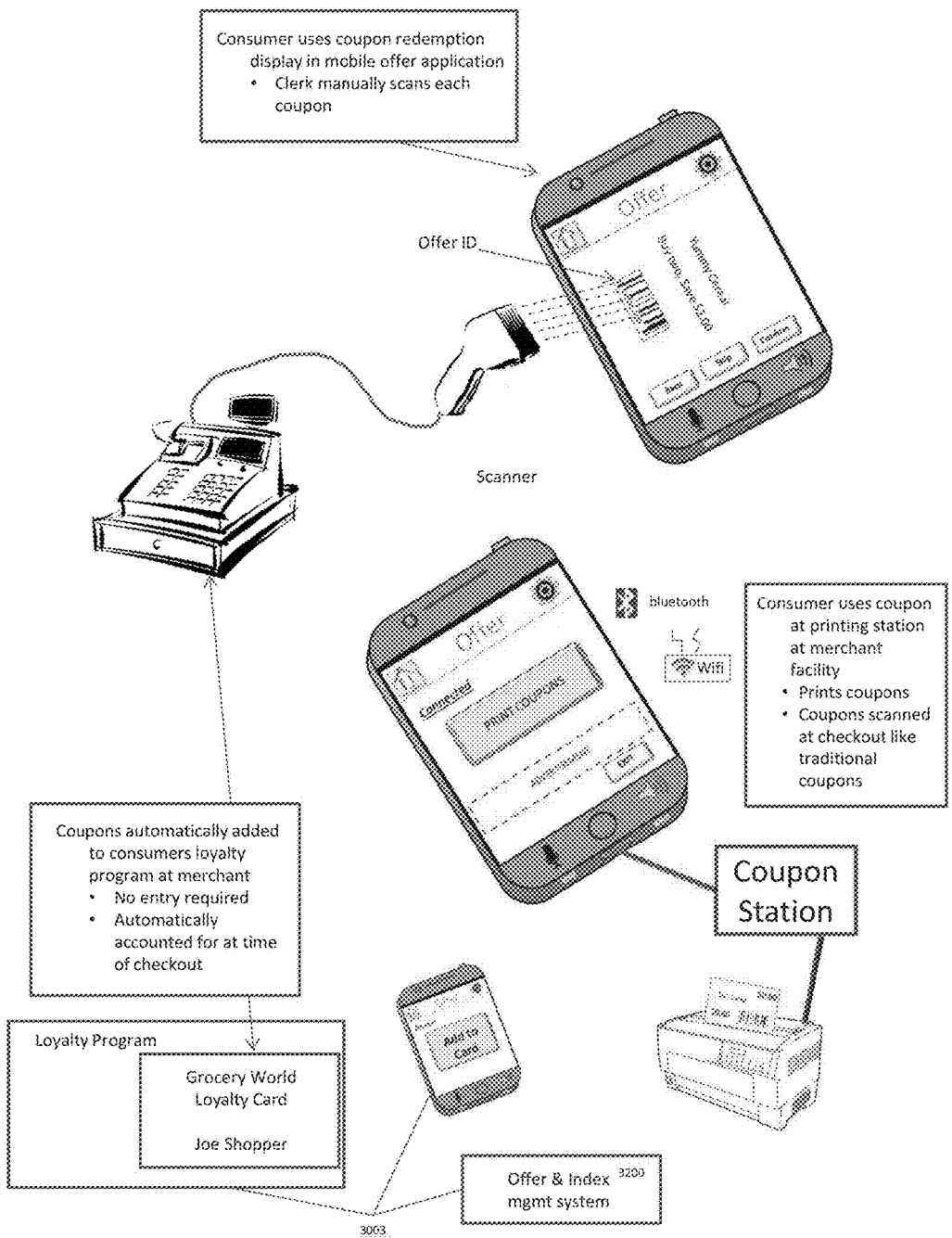
FIG. 11 is a diagram illustrating various systems and methods for utilization of scanned or obtained coupons or codes, in accordance with one or more aspects consistent with the innovations herein.

FIG. 11 is a diagram illustrating various systems and methods for utilization of scanned or obtained coupons or codes, in accordance with one or more aspects consistent with the innovations herein. For example, the mobile offer application of the mobile device displays an offer that may include a scan-able coupon. The consumer shows the display of the coupon to a clerk, who manually scans the coupon(s) shown on the coupon redemption display. Alternatively, the user brings the mobile device within communication range of a coupon station at a merchant facility in order to print out coupons from the mobile device. The mobile offer application is opened to a print coupon dialog for printing the coupons via Bluetooth or WiFi, for example. Once printed, the printed coupons may be scanned at checkout by a clerk in the same manner as traditional coupons. Alternatively, coupons may be added to a consumer's loyalty card by the merchant and has the benefits that no entry is required by the user of the mobile device, and that additional coupons are added automatically at the time of checkout.

Contextual Product Offer Implementations Based on Consumer Location and Purchasing Mode The present disclosure relates to the delivery of product promotions and advertising. More particularly, the present invention relates to contextual advertising based on indoor location, product interests, and/or demographics, such as in a mobile indoor environment.

Systems and methods are provided, here, for product advertisement(s) and promotional offer(s) delivered based on consumer product interest, purchasing mode and user location. Embodiments of these innovations may include an offer delivery program run on a mobile computing and communication device which works in conjunction with a customer's account with a provider and an offer and advertisement system provided by an institution. Here, for example, the offer delivery program may determine the user's location, determine observed and inferred interests for a user, and deliver offers, for observed interests or alternatives, and/or targeted advertisements for products or services within a determined proximity of the user. In some implementations, the user of the mobile device may be notified of availability of determined promotional opportunities, advertisements and information of interest through a mobile computing device.

Embodiments of these systems and methods may address the above-identified problems and disadvantages of the prior art, above stated needs and achieve additional advantages by providing apparatuses, systems and methods, or a combination of the foregoing, that determine a consumer's product interests, both while they are shopping and through empirical means, their exact location within a merchant and uses this product and location information to provide the consumer with advertisements and promotional offers about goods and services (hereinafter "products") matching their interests and/or location while the consumer is in an active purchasing mode making the delivery of promotional offers and advertisements the most effective.

Here, for example, to achieve the best conversion rates and successfully influence consumers to act on an advertisement, offers presented to a consumer should be based on a plurality of factors, including precise location in a merchant/store/facility, the consumer's or product's position in a specific aisle/row/shelf, products scanned or identified of interest by a consumer, the consumer's purchasing history, the customer's shopping list, related products or services, products near the consumer's location, competitive products or services to a nearby product, consumer specific marketing information, the customer's advertising preferences with a merchant, manufacturer, institution or advertiser, the customer's relationship with the merchant or manufacturer of a product, etc.

Marketers typically combine several variables to define a demographic profile. A demographic profile (often shortened to "a demographic") provides enough information about the typical member of this group to create a mental picture of this hypothetical aggregate. For example, a marketer might speak of the single, female, middle-class, age 18 to 24, college educated demographic.

Researchers typically have two objectives in this regard: first to determine what segments or subgroups exist in the overall population; and secondly to create a clear and complete picture of the characteristics of a typical member of each of segments. Once these profiles are constructed, they can be used to develop a marketing strategy and marketing plan. The five primary types of demographics for marketing are age, gender, income level, race and ethnicity, but a demographic can extend beyond these basic parameters.

It becomes clear from the above description that, if an advertiser could identify a consumer's precise location in a merchant facility and correlate this location information with the consumers product preferences, purchasing habits, purchase mode, demographic information and the advertisers marketing strategies, they would be able to better target their advertisements and achieve better results.

To solve this problem, embodiments of the present inventions may utilize a mobile computing and communication device, also known as a portable computing device, in a consumer's possession, to determine products of interest to the consumer, communicate information about products over a digital network to a centralized offer management application, that is used to determine the consumers exact location in a merchant, determine targeted location based advertisements, and deliver these advertisements over a digital communications network while the consumer is in an active purchasing mode.

Generally, embodiments of the current inventions may achieve this through a location and product based offer system that communicates with an application loaded on a mobile computing and communication device, hereinafter the mobile offer application. Recent advancements in computing technology have taken the processing power previously only available on personal computers (PCs) or laptop computers and miniaturized it into mobile computing devices that are carried by many consumers. Examples of consumer based mobile computing devices, used in embodiments of the invention, are set forth further below.

As set forth in part, for example, in connection with FIGS. 1A-2, embodiments of the current inventions may utilize a mobile computing and communication device's mobile network connection to communicate location specific offers from a centralized location and product based advertising and offer system, to the mobile computing and communication device over a digital network. The digital network used to communicate with the mobile computing device can consist of a combination of wireline and wireless networks and networking technologies.

Various embodiments of the present invention may also utilize or rely on one or a plurality of indexes, databases, and two & three dimensional (3D) maps of locations which contain information such as product or item identification information, product or item location information, location based offer information, offer determination information and/or other information required for the operation of the system relative to these locations. The database(s) and index used to provide spatial product, item, ID tag and location information (hereinafter "Index") may include one or more of the following technologies or methodologies: spatial database, relational database, multidimensional database, hierarchical database, flat file database, spatiotemporal database, data cube, online analytical processing (OLAP) cube, grid index, spatial index, suffix tree index, inverted index, ngram index, bitmap index, (dense index), sparse index, reverse index, etc. or any known or future methods for storing, searching, accessing and indexing data for logical, two and three dimensional environments. Additionally, parsing breaks apart the components (words or numbers) of a document or other form of media for insertion into forward and inverted indices. The elements found are called tokens, and so, in the context of indexing and natural language processing, parsing commonly referred to as tokenization. It is also sometimes called word boundary, tagging, text segmentation, content analysis, text analysis, text mining, concordance generation, segmentation, lexing, or lexical analysis. The terms 'indexing', 'parsing', and 'tokenization' are used interchangeably and are consistent with the indexing described in certain embodiments of the present invention. It is contemplated that some embodiments of the present invention would provide methods to support storing indexed data in clustered and non-clustered environments and/or in cloud computing or virtualized environments.

Further, in accord with embodiments of the present invention (e.g., FIG. 2, etc.), a consumer precise location can be determined by using a mobile computing and communication device, the Internet, a Network and a product/tag index/database. Many mobile computing and communication devices include location based services and features. These location determination features can be used by the mobile offer application to determine the macro location of the mobile computing device. A macro location is a low resolution position and is typically limited to outdoor spaces and building/address level resolution. However, the resolution of a typically mobile computing and communication device's location services is generally not granular enough to provide targeted advertisements or marketing messages while indoors or while a consumer is viewing a particular product or at a specific location in a store. In many cases, a mobile computing and communication device's location service is not capable of working when the device is in an indoor location where a clear view to the sky is not possible.

Various embodiments of the present inventions may use the location based services of the mobile computing device to identify a user's macro location and then incorporate the methods associated with the features of the "System and method for determining indoor location through index mapping" aspects herein to determine a user's exact indoor location. Specifically, in one embodiment of the present invention (e.g., FIGS. 1 and 2, etc.) a consumer would use the mobile offer application in conjunction with their mobile computing and communication device, product identifying information, location identifying information and a network connection to or cached store of an index to identify their location in an indoor or outdoor shopping location while looking at a product of interest. A user accomplishes this by using the barcode scanner or the image capture functionality of a mobile computing and communication device to visually identify or electronically identify products or unique location identifying information. A user may also manually enter a code, ID number, select a product from a list, audibly enter product or location information, etc. . . . to identify their location through the mobile offer application, as shown for example, in FIGS. 2 and 4, etc.

Examples of electronically readable codes, tags and IDs that can be scanned by or entered into a mobile computing device include, but are not limited to, product ID codes or numbers; location ID codes or numbers, Universal Product Codes (UPC); linear barcodes including postal coding formats; stacked linear barcode symbol formats such as PDF417; matrix barcodes such as Aztec code, semacode and Quick Response (QR) code; polar coordinate barcodes such as MaxiCode; High Capacity Color Barcode (HCCB); RFIDs; Bokode; dot matrix codes; ZigBee; Bluetooth tags; etc. . . . .

In some embodiments of the present inventions, such as shown in FIGS. 1 and 2 for example, the mobile offer application uses visually unique product identifying information, electronically readable product codes or unique location identifying features or data to determine the consumer's exact indoor location through index information provided by the product offer and index management system. This is accomplished by using a product and/or location unique visual characteristic index and the methods associated with the features of the "System and method for determining indoor location through index mapping" aspects herein. The mobile computing device may use the Internet or a Network connection to communicate its macro location and the product identification codes/data and or ID tag/code information to an index database operatively coupled to a location identification application. Alternatively, the mobile computing device may contain a locally cached index and location identification application and index in its memory. The index and location identification application is used to determine the exact indoor or outside location of the consumer within a macro location as well as to identify products or offers of interest within the immediate proximity of the consumer, referred to as the consumer's precise location.

Another embodiment of the current invention uses the mobile computing and communication device's motion detection and movement measuring components, such as Microelectromechanical Systems (MEMS) accelerometers, gyroscopes, altimeter, etc. . . . to track acceleration, motion and movement of the consumer (e.g., FIG. 4). This allows the Mobile Application to maintain the consumer's specific location within a macro location during the periods between product or location identification scans. To achieve this, the mobile offer application could connect to a map of the macro location through its Network connection, the Internet or use a locally cached map of the macro location stored in its memory. The index determined precise location is then updated and maintained in the macro locations map based on the movement and motion information gathered from the mobile computing and communication device's sensors through the incorporation of an inertial navigation system (INS) using the available sensors in the mobile computing and communication device.

An inertial navigation system includes at least a processing device and module containing accelerometers, gyroscopes, or other motion-sensing devices. The INS is initially provided with its position and velocity from another source (a human operator, a GPS satellite receiver, etc.), and thereafter computes its own updated position and velocity by integrating information received from the motion sensors. The advantage of an INS is that it requires no external references in order to determine its position, orientation, or velocity once it has been initialized.

An INS can detect a change in its geographic position (a move east or north, for example), a change in its velocity (speed and direction of movement), and a change in its orientation (rotation about an axis). It does this by measuring the linear and angular accelerations applied to the system. Since it requires no external reference (after initialization), it is typically immune to outside influences.

Inertial-navigation systems are used in many different moving objects, including vehicles—such as aircraft, submarines, spacecraft—and guided missiles. However, their application has been spreading to consumer devices such as video game controllers and mobile phones.

Gyroscopes measure the angular velocity of the system in the inertial reference frame. By using the original orientation of the system in the inertial reference frame as the initial condition and integrating the angular velocity, the system's current orientation is known at all times. This can be thought of as the ability of a blindfolded passenger in a car to feel the car turn left and right or tilt up and down as the car ascends or descends hills. Based on this information alone, the passenger knows what direction the car is facing but not how fast or slow it is moving, or whether it is sliding sideways.

Accelerometers measure the linear acceleration of the system in the inertial reference frame, but in directions that can only be measured relative to the moving system (since the accelerometers are fixed to the system and rotate with the system, but are not aware of their own orientation). This can be thought of as the ability of a blindfolded passenger in a car to feel themselves pressed back into their seat as the vehicle accelerates forward or pulled forward as it slows down; and feel themselves pressed down into their seat as the vehicle accelerates up a hill or rise up out of their seat as the car passes over the crest of a hill and begins to descend. Based on this information alone, they know how the vehicle is accelerating relative to itself, that is, whether it is accelerating forward, backward, left, right, up (toward the car's ceiling), or down (toward the car's floor) measured relative to the car, but not the direction relative to the Earth, since they did not know what direction the car was facing relative to the Earth when they felt the accelerations.

However, by tracking both the current angular velocity of the system and the current linear acceleration of the system measured relative to the moving system, it is possible to determine the linear acceleration of the system in the inertial reference frame. Performing integration on the inertial accelerations (using the original velocity as the initial conditions) using the correct kinematic equations yields the inertial velocities of the system, and integration again (using the original position as the initial condition) yields the inertial position. In our example, if the blindfolded passenger knew how the car was pointed and what its velocity was before he was blindfolded, and if they are able to keep track of both how the car has turned and how it has accelerated and decelerated, they can accurately know the current orientation, position, and velocity of the car at any time.

All inertial navigation systems suffer from integration drift: small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input. Therefore the position is periodically corrected by input from some other system.

Accordingly, inertial navigation is usually used to supplement other navigation systems, providing a higher degree of accuracy than is possible with the use of any single system. For example, if, a current location is intermittently updated by determining a precise location from a known source such as an indexed location or product tag within a location, the position maintained by an INS will remain precise for a much longer time.

Estimation theory in general, and Kalman filtering in particular, provide a theoretical framework for combining information from various sensors in a INS. By properly combining the information from an INS and other systems (GPS/INS/location index), the errors in position and velocity can remain stable. Furthermore, INS can be used as a short-term fallback to determine a current location between precise locations updates where product and/or location unique visual characteristics are identified.

Various embodiments of the innovations herein may use the precise location and product information provided by the index and location identification application to present offers to the consumer, through the mobile offer application, based on their specific precise location as determined by the location identification application. This is accomplished by using a product and/or location unique visual characteristic index and the methods associated with the features of 'System and method for delivery of contextual advertising through location, product interest and index mapping' aspects herein. It is contemplated that, in some embodiments of the present invention, offers for other products within their immediate proximity, alternative products, related products, etc. . . . would be presented to the consumer through the mobile offer application (e.g., FIGS. 6C, 10A, etc). It is also contemplated that, in some embodiments of the present invention, the mobile offer application would present offers or advertisements to a consumer by tracking their movement through the macro location through the use of the mobile computing and communication device's sensors, after initially establishing a base precise location (e.g., FIGS. 1, 2, etc.) It is contemplated that the contextual advertising, described herein, will use performance-based advertising methodologies and pricing philosophies.

Performance-based advertising is a form of advertising in which the purchaser pays only when there are measurable results. Performance-based advertising is becoming more common with the spread of electronic media, notably the Internet, where it is possible to measure user actions resulting from and advertisement or offer.

There are four common pricing models used in the online performance advertising market:

CPM (Cost-per-Mille, or Cost-per-Thousand) Pricing Models charge advertisers for impressions, i.e. the number of times people view an advertisement. Display advertising is commonly sold on a CPM pricing model. With CPM advertising is that advertisers are charged even if the target audience does not click on the advertisement.

CPC (Cost-per-Click) advertising overcomes problems associated with CPM pricing models by charging advertisers only when the consumer clicks on the advertisement. However, due to increased competition, search keywords have become very expensive.

Cost per Lead (CPL) pricing models are the most advertiser friendly. CPL models allow advertisers to pay only for qualified leads as opposed to clicks or impressions and are at the pinnacle of the online advertising ROI hierarchy. In a Cost-per-Lead pricing model, advertisers pay only for qualified leads—irrespective of the clicks or impressions that went into generating the lead.

Cost per Action (CPA) is where advertisers pay for a specific action such as a credit card transaction or purchase transaction (also called CPO, Cost-Per-Order).

In CPA campaigns, the advertiser typically pays for a completed sale involving a credit card transaction or purchase and is typically the most expensive "cost-per" advertising model. CPA is all about now—it focuses on driving consumers to buy at that exact moment. If a consumer doesn't buy anything, there's no easy way to re-market to them and no cost associate with the initial marketing.

Embodiments of the present invention focus on the CPA model, but all performance marketing models can be contemplated to be supported.

It is further contemplated that, in some embodiments of the present invention, the image capture capabilities of the mobile computing and communication device could be used to passively collect product, 3D special or electronically readable tag images as a user navigates through a 3D space, as shown in FIG. 9B. These images would be used to identify products, isles or rows by their visually unique characteristics, visible or electronically readable tags. As specific products or electronically readable tags are identified, the user's location is updated using the product and location index either locally or over a network connection. Additionally, physical and visual characteristics of the precise location inside the macro location, such as rows, signs, isles, walls, windows, floors, tiles, etc. . . . may also be indexed and used to identify the precise location of the user. This is similar to the methods used by the human brain to recognize faces and locations. Throughout a macro location exist physical objects with unique visual characteristics. These characteristics will have key identifying components that differentiate them form one another, similar to a fingerprint, which can be identified, collected and then used to identify a precise location based on the special relationship of the viewer to the characteristics.

Various embodiments of the present inventions are configured to enable the consumer to accept or reject offers presented through the mobile offer application (e.g., FIG. 8B). In such embodiments, the mobile offer application could communicate a consumer's product and offer preferences to a centralized location and product offer application. Additionally, accepted offers would preferably be stored locally in the memory of the mobile computing and communication device or in centrally located applications accessed over a Network or the Internet by the mobile offer application; using the mobile computing and communication device's network connection(s). The 'System and method for delivery of contextual advertising through location, product interest and index mapping' aspects herein teach how a consumer's specific location, expressed product interests through scans, offer acceptances or rejections and available offers impact the contextual advertisements delivered to the mobile offer application.

Certain embodiments herein may use the mobile computing and communication device's human interface features to enable a consumer to accept or reject offers. Methods to accept or reject an offer through the mobile computing and communication device could include; tactically selecting an indicator on its display, using the motion detection sensors to communicate or input a gesture, audibly communicating a selection, pressing a button, tapping a keyboard, or by using any other method of interfacing with the mobile computing device to communicate an intention or command such as shown in FIG. 4.

Alternatively, the current invention could present a map from the consumer's current precise location to the precise location of a product of interest, an accepted offer for a product in a different location or a precise location within the macro location (e.g., FIGS. 6C, 8C, etc.). This is accomplished by using macro location maps/floorplans, a product and/or location unique visual characteristic index and the methods associated with features of the 'System and method for maintaining indoor location and providing directions' aspects herein. Additionally a consumer could search for or enter a product into a mobile offer application and have the application map the desired product from their current location and potentially provide a picture of the product and/or its exact location on a shelf.

Other embodiments of the invention allow a consumer to manually search for a product(s) of interest within the current or a future macro destination(s) to see if the product(s) of interest are present at the macro location and if offers exist for those products. The consumer would be able to use the mobile offer application to select items of interest from a list of products in a store, facility or macro location, search for a specific product, enter product specifics via a keyboard or tactical input device, use voice recognition technologies to input product specifics or interests. The mobile offer application, product and location index and/or offer application would determine the location(s) of applicable product(s) and provide mapping to them as well as offers, advertisements, marketing or information to the consumer or other application(s) (e.g., FIGS. 4, 6C, 8B, 8C, 10A, 10B, etc).

Alternatively, the current invention could allow a consumer to use a local or web based application to perform the above mentioned product searches and identify products of interest to them on a typical or non-mobile computing device such as a desktop Personal Computer (PC), gaming system, computing capable TV, or any other element capable of executing computer executable code and possessing a Network connection (e.g. FIG. 3). In all embodiments, the current invention allows the consumer to create shopping lists and identify products of interest. The mobile offer application could create maps to products on the shopping list through the macro location. Embodiments herein may also notify the consumer visually, tactically and or audibly when they are in close proximity to a product of interest, a product on their shopping list or a product the location and product based offer system determines would be of interest to the consumer (e.g., FIGS. 4, 6C, 8B, etc.)

As shown in FIGS. 6C, 8B, and 9B, for example, it is contemplated that some embodiments of the present invention would provide a "Shelf View" of a specific location in a store to aid a consumer in finding/locating a specific product. This shelf view would be similar to existing technologies for geographic mapping that show pictures or graphical representations of geographies, streets, buildings, addresses, etc. . . . . . Similarly, the shelf view would provide picture or graphical views of a specific shelf/location in a macro location as determined by a consumer's current or product of interest's precise location. The product of interest could be highlighted in the view to allow a consumer to more easily locate a specific product of interest among all other products in its proximity.

Other embodiments may track the location of a consumer over time as well as their product purchases and preferences. This information could be captured and stored by the mobile application or centralized location and product based offer system and may be incorporate in an index specific to that consumer (e.g. FIGS. 2, 3, 8A, etc.)

In all embodiments, the current invention allows consumers to identify products they intend to purchase and to redeem offers they accepted for the products they intend to purchase. Offer redemption can be achieved using multiple methods. The consumer can use the mobile offer application to visually display an image on the devices display that is capable of being scanned by a cashier or bar code scanner like a typical coupon, such as shown in FIG. 10A. The mobile offer application could alternatively use the mobile computing and communication devices network, Bluetooth or a devices physical serial or parallel connection, such as a Universal Serial Bus (USB) connection, etc. to electronically add offers to a consumer's loyalty card/account or a payment system at that macro location. Another method would allow the mobile offer application to use the mobile computing and communication devices Network, Bluetooth or a physical connection, such as a USB connection, etc. . . . to interface with a printing device at the macro location to physically print coupon like offers for redemption, as shown in FIG. 11. Alternatively, the location and product based offer system could interface with a printing device or offer redemption service at the macro location over a Network and/or the Internet to print and/or automatically or electronically redeem offers as a consumer checks out with a representative/cashier at the macro location.

It is further contemplated that in some embodiments a consumer would be able to scan the images of traditional coupons into the system and use these digital images of coupons in the same way a traditional coupon would be used, eliminating the need to clip and organize coupons. It is further contemplated that a digitally scanned coupon would automatically be added to the consumers shopping list so they do not forget to use the coupon while shopping. Additionally, commercials, billboards audio or print advertisements can include simple coupon or offer codes that could be entered into the system and organized or redeemed using the methods discussed herein.

Other embodiment include application or live features used while shopping that allow the consumer to see their savings, choose their offer and marketing preferences, select "favorite" products so they can be notified when offers exist for those products, enter shopping lists, select recipes that will populate their shopping list with the required ingredients, scan product as they are consumed so they are added to their shopping list and marked on the offer watch list, see and edit their inventory of products/groceries on-hand, share and compete with their 'friends' through social networking, win prizes and incentives based on their product savings, etc. It is contemplated that these features of the system can be accessed through applications loaded on their mobile computing and communication device or via a web interface operating on any compatible device connected to the Internet.

It is to be understood that both the foregoing general description and the following detailed description are by examples and are intended to provide further explanation of the invention as claimed and may not describe all possible embodiments of the present invention.

Implementations and Other Nuances

Examples of consumer based mobile computing devices, used in embodiments of the invention, include smartphones (iPhone, Android, Blackberry, etc.), personal digital assistants (PDAs), cell phones, tablet PCs (iPad, Zoom, Playbook, Galaxy, etc.), phablets (ultra-mobile personal computing devices that are larger than a smartphone, but smaller than a tablet), e-book readers also known as e-readers (nook, kindle, etc.), wearable computers taking the form of watches, wrist PCs, portable music devices, etc., portable or wearable augmented reality devices that interface with a user's environment through sensors and actuators and can use head-mounted displays and virtual retinal displays for visualization and or data communication purposes, or any similar portable computing devices. Mobile computing and communication devices are not limited to the above listed consumer based devices. Embodiments of the current invention could operate on any existing or future mobile computing or augmented reality device.

In general, a mobile or portable computing device is defined as any device small enough to be carried in a hand, connected to a shopping cart, or worn on the body, that possesses one or more of the following key components: a central processing unit (CPU), hereinafter "processing device", application specific integrated circuit (ASIC), integrated circuit (IC), or microprocessor, capable of executing computer readable code or instructions; a display/presentation device to present information in visual or tactical form to the user, such as light emitting diodes (LEDs), liquid crystal displays (LCDs), electroluminescent displays (ELDs), electronic paper/e-ink, plasma display panels (PDPs), thin film transistors (TFTs), organic light emitting diodes (OLEDs), laser displays, holographic displays, tactical electronic displays, or any other existing or future methods for visually, audibly or tactically presenting information or images to a user; a human interface or input device such as a touch screen, keyboard, stylus, mouse, trackball, button, scanner (barcode, laser, LED, image, CCD, etc.), camera, headset, pointing stick, joystick, motion sensor, microphone, gesture recognition, or any other existing or future methods for humans to tactically, visually or audibly communicate commands and controls or data to the mobile device; volatile or non-volatile memory used by the mobile computing and communication device such as ROM, RAM, NVRAM, flash memory, EPROM, EEPROM, or any other existing or future methods for the mobile computing and communication device to store and execute computer readable code or data; a mobile power source such as a battery, solar cell, fuel cell, capacitor, generator or any other existing or future methods for storing and releasing or generating on demand power for the mobile device; and optionally an audio device such as a typical speaker, piezoelectric audio device, magnetostrictive speaker, digital speaker, or any other existing or future methods for generating human audible sound waves; and a mobile network communications device used to communicate information over a digital wireless or wireline network.

A processing device is the hardware within a computer or computing device that carries out the instructions of a computer program or computer executable code by performing the basic arithmetical, logical, and input/output operations of the system. Hardwired into a processors design is a list of basic operations it can perform, called an instruction set. Such operations may include adding or subtracting two numbers, comparing numbers, or jumping to a different part of a program or executable code. Each of these basic operations is represented by a particular sequence of bits; this sequence is called the opcode for that particular operation. Sending a particular opcode to a CPU will cause it to perform the operation is represented by that opcode. To execute a computer executable instruction in a program, the CPU uses the opcode for that instruction as well as its arguments (for instance the two numbers to be added, in the case of an addition operation). A computer program is therefore a sequence of instructions, with each instruction including an opcode and that operation's arguments. The actual mathematical operation for each instruction is performed by a subunit of the processor known as the arithmetic logic unit (ALU). In addition to using its ALU to perform operations, a CPU is also responsible for reading the next instruction from memory, reading data specified in arguments from memory, and writing results to memory. In many CPU designs, an instruction set will clearly differentiate between operations that load data from memory, and those that perform math. In this case the data loaded from memory is stored in registers, and a mathematical operation takes no arguments but simply performs the math on the data in the registers and writes it to a new register, whose value a separate operation may then write to memory. The processing device contains control unit circuitry that uses electrical signals to direct the entire system to carry out stored program instructions or executable instructions. The control unit does not execute program instructions; rather, it directs other parts of the system to do so. The control unit communicates with both the arithmetic/logic unit and memory. In context of the present invention a processing unit can also include microcontrollers, ASICs, analog to digital converters, digital to analog converters, digital signal processors, other types of processing circuitry, and/or any combination of the forgoing.

Wireless data connections used for mobile computing by embodiments of the present invention can take several general forms; cellular, Wi-Fi and satellite. Cellular data service uses technologies such as GSM, PCS, CDMA or GPRS, and more recently 3G and networks such as W-CDMA, EDGE or CDMA2000 and 4G networks such as LTE or WiMAX, or any future cellular data technologies known or unknown. These networks are usually available within range of commercial cell towers and provide data network connectivity to mobile computing devices. Wi-Fi connections often offer higher performance than cellular, and may be provided by either a personal, private business network or accessed through public hotspots, and have a typical range of hundreds of feet indoors and up to 1000 feet outdoors. Satellite Internet access covers areas where cellular and Wi-Fi are not available and may be set up anywhere the user has a line of sight to the satellite's location. Wireless telecommunications networks are generally implemented and administered using a transmission system called radio waves, often using dedicated microwave frequencies for non-line of sight paths (often referred to as Radio Frequency (RF) signals) or modulated laser light beams over line of sight paths. Some wireless network deployments combine networks from multiple cellular networks or use a mix of cellular, Wi-Fi and satellite.

In general, a wireless network refers to any type of digital network that is not connected by cables of any kind. However, a wireless network connects to a wireline network in order to interface with the Internet, other carrier voice and data networks, business networks and personal networks. A wireline network is typically carried over copper twisted pair, coaxial cable or fiber optic cables. There are many different types of wireline networks including, wide area networks (WAN), metropolitan area networks (MAN), local area networks (LAN), campus area networks (CAN), global area networks (GAN), like the Internet, and virtual private networks (VPN). Hereinafter "Network" refers to any combination of combined wireless, wireline, public and private data networks that are typically interconnected through the Internet, to provide a unified networking and information access solution.

The Internet is a global system of interconnected computer networks that use the standard Internet protocol suite (often called TCP/IP, although not all applications use TCP) to serve billions of users worldwide. It is a network of Networks that consists of millions of private, public, academic, business, and government Networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email and mobile applications that run on many mobile computing devices.

The Internet is typically accesses and navigated with a web browser. A web browser is a software application for retrieving, presenting and traversing information resources on the World Wide Web (Internet). An information resource is identified by a Uniform Resource Identifier (URI) and may be a web page, image, video, script, application, plugin or other piece of content. Hyperlinks present in resources enable users to easily navigate their browsers to related resources. A web browser can also be defined as an application software or program designed to enable users to access, retrieve and view documents and other resources on the Internet. Although browsers are primarily intended to use the World Wide Web, they can also be used to access information provided by web servers in private networks or files in file systems. The major web browsers are Chrome, Firefox, Internet Explorer, Opera, and Safari. A web browser typically accesses data from a web server over the Internet.

Web server can refer to either the hardware (the computer) or the software (the computer application) that helps to deliver content that can be accessed through the Internet. The most common use of web servers is to host websites, but there are other uses such as gaming, data storage and bor running enterprise applications.

A primary function of a web server is to deliver web pages on the request to clients using the Hypertext Transfer Protocol (HTTP). This means delivery of HTML documents and any additional content that may be included by a document, such as images, style sheets and scripts.

A user agent, commonly a web browser or web crawler, initiates communication by making a request for a specific resource using HTTP and the server responds with the content of that resource or an error message if unable to do so. The resource is typically data from the server's secondary storage, but this is not necessarily the case and depends on how the web server is implemented and if it uses cloud computing or virtualization.

While the primary function is to serve content, a full implementation of HTTP also includes ways of receiving content from clients. This feature is used for submitting web forms, including uploading of files, data, information and preferences.

Many generic web servers also support server-side scripting using Active Server Pages (ASP), Hypertext Preprocessor (PHP), or other scripting languages. This means that the behavior of the web server can be scripted in separate files, while the actual server software remains unchanged. Usually, this function is used to create HTML documents dynamically ("on-the-fly") as opposed to returning static documents.

The former is typically used with databases while the latter is typically much faster and more easily cached.

Web servers are not always used for serving the World Wide Web. A web server may then be used as a part of a system for monitoring and/or administering the devices or services in question. This usually means that no additional software has to be installed on the client computer to access or use a particular service or device; since only a web browser is required (which is typically included with most operating systems and computing devices).

Most traditional communications media including telephone, music, film, and television have been reshaped or redefined by the Internet, giving birth to new services. The Internet has enabled or accelerated new forms of human interactions through instant messaging, Internet forums, and social networking. Online shopping has boomed both for major retail outlets and small artisans and traders. Likewise, embodiments of the invention incorporate the Internet, with its interconnected Networks, as the medium for the mobile offer application to communicate with the centralized offer management application, which determines the a consumers location and delivers advertisements and offers to the consumer's mobile computing and communication device while they are shopping; redefining how consumers take advantage of offers.

An index is one way of providing quicker access to data. Indices can be created on any combination of attributes on a relation. Queries that filter using these attributes can find matching tuples randomly using the index, without having to check each tuple in turn. This is analogous to using the index of a book to go directly to the page on which the information you are looking for is found i.e. you do not have to read the entire book to find what you are looking for. Relational databases typically supply multiple indexing techniques, each of which is optimal for some combination of data distribution, relation size, and typical access pattern. Indices are usually implemented via B+ trees, R-trees, and bitmaps. Indices are usually not considered part of the database, as they are considered an implementation detail, though indices are usually maintained by the same group that maintains the other parts of the database. It should be noted that use of efficient indexes on both primary and foreign keys can dramatically improve query performance.

Although the present invention has been described in considerable detail with reference to certain embodiments thereof, other embodiments are possible. Therefore their spirit and scope of the present inventions should not be limited to the description of the embodiments contained herein. It will be apparent to those skilled in the art that various modifications and variations can be made to the structure of the present innovations without departing from the scope or spirit of the inventions herein. In view of the foregoing, it is intended that the present invention cover modifications and variations of this invention provided they fall within the ambit of the present innovations.

This application also incorporates earlier lab notebook type materials, attached hereto as Appendices.

What is claimed is:

1. A method of tracking a mobile device location, the method comprising:
   at a server with a processor and memory, the server in communication with the mobile device,
   receiving a first mobile device location from a first global positioning system (GPS) signal captured at the mobile device;
   retrieving a facility identification information from a database, based on the received first mobile device location;
   receiving a captured first item information from a first item within the facility by a scanner in the mobile device;
   retrieving a first item location within the facility from a database based on the captured first item information, wherein the database includes gathered interior dimensions of the facility including layout and dimensions of item rows and item locations within the rows;
   determining a first mobile device location within the facility as a function of the first item product location;
   receiving movement information gathered from an Inertial Navigation System (INS) motion detection device the mobile device;
   determining a location of a second item within a proximity of the mobile device based on the first item location and the received INS movement information;
   sending information about the second item to the mobile device based on the determined first mobile device location and the received INS movement information, wherein the second item information may be displayed on the mobile device when the mobile device is in proximity of the second item location;
   receiving a selection of acceptance of the second item information from the mobile device.

2. The method of claim 1 further comprising:
   retrieving relationship information from the database based on the second item information;
   determining item information based on the second product location and the relationship information obtained from the database; and
   providing the item information by the mobile device.

3. The method of claim 1 further comprising:
   retrieving location information from the database based on the second item information;
   determining a second mobile device location; and
   providing the mobile device location on the mobile device.

4. The method of claim 1 wherein the motion detection device comprises one or more of: an accelerometer, a gyroscope, and a compass.

5. The method of claim 4 wherein the motion detection device calculates orientation, acceleration and direction of motion of the mobile device.

6. The method of claim 1 further comprising:
   updating second item in proximity to the mobile device based on the detected movement.

7. The method of claim 1 wherein the capturing of the first item information is by a scanner on the mobile device and the first item information is in a code format.

8. A method of tracking a mobile device location, the method comprising:
- at a server with a processor and memory, the server in communication with the mobile device,
- mapping interior dimensions of a facility including layout and dimensions of item rows;
- capturing first item information from a first item within the facility by a scanner on the mobile device;
- retrieving a first item location within the facility from a database of the mapped interior dimensions of the facility based on the captured first item information;
- determining a first mobile device location as a function of the first item location and a global positioning system (GPS) signal received at the mobile device;
- receiving movement information from a motion detection device and the GPS information from the mobile device;
- determining a second item location within a proximity of the mobile device based on the first item location and the received GPS information;
- sending second item information to the mobile device based on the determined mobile device information and second item location;
  - wherein the second item information may be displayed on the mobile device when the mobile device is in proximity of the second item location; and
- receiving a selection of acceptance of the second item information from the mobile device.

9. The method of claim 8 wherein the motion detection device comprises one or more of: an accelerometer, a gyroscope, a compass, and an inertial navigation system (INS).

\* \* \* \* \*